US011678304B2

(12) United States Patent
Dhanda et al.

(10) Patent No.: US 11,678,304 B2
(45) Date of Patent: Jun. 13, 2023

(54) SYNCHRONIZING A USER EQUIPMENT IDENTIFIER FOR PRECONFIGURED UPLINK RESOURCES

(71) Applicant: QUALCOMM Incorporated, San Diego, CA (US)

(72) Inventors: Mungal Singh Dhanda, Slough (GB); Umesh Phuyal, San Diego, CA (US); Luis Fernando Brisson Lopes, Swindon (GB)

(73) Assignee: QUALCOMM INCORPORATED, San Diego, CA (US)

( * ) Notice: Subject to any disclaimer, the term of this patent is extended or adjusted under 35 U.S.C. 154(b) by 224 days.

(21) Appl. No.: 16/948,679

(22) Filed: Sep. 29, 2020

(65) Prior Publication Data
US 2021/0112526 A1    Apr. 15, 2021

Related U.S. Application Data

(60) Provisional application No. 62/914,098, filed on Oct. 11, 2019.

(51) Int. Cl.
*H04W 72/04* (2023.01)
*H04W 76/11* (2018.01)
(Continued)

(52) U.S. Cl.
CPC ........... *H04W 72/04* (2013.01); *H04W 72/23* (2023.01); *H04W 76/11* (2018.02); *H04W 76/20* (2018.02)

(58) Field of Classification Search
CPC ... H04W 72/04; H04W 76/11; H04W 72/042; H04W 76/20; H04W 72/1268; H04W 72/1284; H04W 72/1257; H04L 1/1671; H04L 1/1819; H04L 1/1864; H04L 1/1887; H04L 1/1893
See application file for complete search history.

(56) References Cited

U.S. PATENT DOCUMENTS

2021/0345344 A1* 11/2021 Sha ................... H04W 72/0446
2021/0345372 A1* 11/2021 Li ...................... H04W 72/1268
(Continued)

FOREIGN PATENT DOCUMENTS

WO    WO 2020034572 A1 *  2/2020
WO    WO 2020/065619 A1 *  4/2020
WO    WO 2020/168576 A1 *  8/2020

OTHER PUBLICATIONS

U.S. Appl. No. 62/753,330 (Year: 2018).*
(Continued)

*Primary Examiner* — Rushil Parimal Sampat
(74) *Attorney, Agent, or Firm* — Harrity & Harrity, LLP; Nerrie M. Zohn

(57) ABSTRACT

Some techniques and apparatuses described herein enable synchronization of a user equipment (UE) identifier between a UE and a base station upon UE identifier reallocation, which enables the UE to use preconfigured uplink resources to reduce latency, reduce signaling overhead, or the like. For example, some techniques and apparatuses described herein enable the UE to use preconfigured uplink resources when a UE identifier reallocation occurs between preconfigured uplink resource configuration and use of the preconfigured uplink resources by the UE to transmit uplink data.

25 Claims, 19 Drawing Sheets

(51) Int. Cl.
*H04W 72/23* (2023.01)
*H04W 76/20* (2018.01)

(56) References Cited

U.S. PATENT DOCUMENTS

| | | | | |
|---|---|---|---|---|
| 2021/0392659 | A1* | 12/2021 | Tirronen | H04L 1/1819 |
| 2022/0007391 | A1* | 1/2022 | Höglund | H04W 72/1268 |
| 2022/0150925 | A1* | 5/2022 | Chao | H04W 72/042 |

OTHER PUBLICATIONS

Ericsson: "PUR Data Transmission-Remaining Open Issues", 3GPP Draft, 3GPP TSG-RAN WG2 #107bis, R2-1913121—PUR Data Transmission-Remaining Open Issues, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019 (Oct. 4, 2019), XP051804845, 4 pages, Retrieved from the Internet: URL: https://ftp.3gpp.org/tsg_ran/WG2_RL2/TSGR2_107bis/Docs/R2-1913121.zip. R2-1913121—PUR Data Transmission Remaining open issues.docx [retrieved on Oct. 4, 2019].

Huawei: et al., "Handling of D-PUR Configuration for CP Solution", 3GPP Draft, 3GPP TSG-RAN WG2 Meeting #107bis, R2-1912610, Handling of D-PUR Configuration for CP Solution, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019 (Oct. 4, 2019), XP051804564, 7 pages, Retrieved from the Internet: URL: https://ftp.3gpp.org/tsg_ran/WG2_RL2/TSGR2_107bis/Docs/R2-1912610.zip.R2-1912610 Handling of D-PUR configuration for CP solution.doc [retrieved on Oct. 4, 2019].

Huawei: "Report of Email Discussion [1 06#59][R16 NB-IoT/eMTC] D-PUR Procedural Steps", 3GPP Draft, 3GPP TSG-RAN WG2 Meeting#107, R2-1910173, Report of [106#59] on D-PUR General Procedure Steps, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019 (Aug. 16, 2019), XP051767954, 25 pages, Retrieved from the Internet: URL: http://www.3gpp/org/ftp/tsg_ran/WG2_RL2/TSGR2_107/Docs/R2-1910173.zip. [retrieved on Aug. 16, 2019].

International Search Report and Written Opinion—PCT/US2020/053440—ISA/EPO—dated Dec. 14, 2020.

Sierra Wireless: "Email discussion [104#43][eMTC & NB-IoT R16] D-PUR report", 3GPP Draft, 3GPP TSG-RAN WG2 Meeting#105bis, R2-1905204, 3rd Generation Partnership Project (3GPP), Mobile Competence Centre, 650, Route Des Lucioles, F-06921 Sophia-Antipolis Cedex, France, vol. RAN WG2, No. Xian, China, Apr. 8, 2019-Apr. 12, 2019, Apr. 3, 2019, (Apr. 3, 2019), XP051709673, 45 pages, Retrieved from the Internet: URL: http://www.3gpp.org/ftp/tsg%5Fran/WG2%5FRL2/TSGR2%5F105bis/Docs/R2%2D1905204%2Ezip. [retrieved on Apr. 3, 2019], Question 27, p. 31-p. 32, p. 35-p. 36.

ZTE Corporation: et al., "Remaining Issues For D-PUR in IDLE", 3GPP Draft, 3GPP TSG-RAN WG2 #107bis, R2-1912896, Remaining Issues For D-PUR in IDLE, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019 (Oct. 4, 2019), XP051790930, 10 pages, Retrieved from the Internet: URL: http://www.3gpp.org/ftp/tsg_ran/WG2_RL2/TSGR2_107bis/Docs/R2-1912896.zip. [retrieved on Oct. 4, 2019] section "RAN2#106 agreements", p. 2 RAN2#107 agreements; p. 2-p. 3 section 2 .1. 3; p. 5-p. 6 section 2.3; p. 10.

* cited by examiner

SYNCHRONIZING A USER EQUIPMENT IDENTIFIER FOR PRECONFIGURED UPLINK RESOURCES

CROSS-REFERENCE TO RELATED APPLICATION

This Patent Application claims priority to U.S. Provisional Patent Application No. 62/914,098, filed on Oct. 11, 2019, entitled "SYNCHRONIZING A USER EQUIPMENT IDENTIFIER FOR PRECONFIGURED UPLINK RESOURCES," and assigned to the assignee hereof. The disclosure of the prior Application is considered part of and is incorporated by reference into this Patent Application.

BACKGROUND

Field

Aspects of the present disclosure generally relate to wireless communication and to techniques and apparatuses for synchronizing a user equipment identifier for preconfigured uplink resources.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In some cases, a base station may be unaware of a user equipment (UE) identifier reallocation, and may continue to store a first UE identifier in a UE context for the UE. If the UE enters an RRC idle mode, and then later enters an RRC connected mode, the UE will send a second UE identifier to the base station, and the base station will store the second UE identifier in association with the UE context for the UE. However, for preconfigured uplink resources, the UE may transmit uplink data to the base station without first establishing a new RRC connection. In this case, the UE would transmit the second UE identifier along with the uplink data, but the base station would not have the second UE identifier stored in memory in association with the UE. As a result, the base station may be unable to verify the UE and/or may discard the uplink data.

Some techniques and apparatuses described herein enable synchronization of a UE identifier between a UE and a base station upon UE identifier reallocation, which enables the UE to use preconfigured uplink resources to reduce latency, reduce signaling overhead, and/or the like. For example, some techniques and apparatuses described herein enable the UE to use preconfigured uplink resources when a UE identifier reallocation occurs between preconfigured uplink resource configuration and use of the preconfigured uplink resources by the UE to transmit uplink data.

In some aspects, a method of wireless communication, performed by a UE, may include transmitting, to a base station, a connection request that indicates a first UE identifier for preconfigured uplink resources; receiving, from the base station, a configuration for the preconfigured uplink resources; receiving a UE identifier reallocation message indicating to the UE to replace the first UE identifier with a second UE identifier; and transmitting, to the base station, a request to update the first UE identifier to the second UE identifier for the preconfigured uplink resources based at least in part on receiving the UE identifier reallocation message.

In some aspects, a method of wireless communication, performed by a UE, may include transmitting, to a base station, a connection request that indicates a UE identifier that identifies the UE in a core network; receiving, from the base station, a configuration for preconfigured uplink resources (PUR), wherein the configuration indicates an uplink resource and a PUR identifier; and transmitting, to the base station, a preconfigured uplink message in the uplink resource, wherein the preconfigured uplink message includes uplink data, the UE identifier, and the PUR identifier.

In some aspects, a method of wireless communication, performed by a base station, may include receiving, from a UE, a connection request that indicates a first UE identifier for preconfigured uplink resources; transmitting, to the UE, a configuration for the preconfigured uplink resources; receiving a request to update the first UE identifier to a second UE identifier for the preconfigured uplink resources; and updating, in a memory of the base station that stores context associated with the preconfigured uplink resources, the first UE identifier to the second UE identifier based at least in part on receiving the request to update the first UE identifier to the second UE identifier.

In some aspects, a method of wireless communication, performed by a base station, may include receiving, from a UE, a connection request that indicates a UE identifier that identifies the UE in a core network; transmitting, to the UE, a configuration for PUR, wherein the configuration indicates an uplink resource and a PUR identifier; and receiving, from the UE, a preconfigured uplink message in the uplink resource, wherein the preconfigured uplink message includes uplink data, the UE identifier, and the PUR identifier.

In some aspects, a method performed by a core network device may include setting up a connection with a base station, wherein the connection is associated with a UE and a first UE identifier that identifies the UE in a core network and that is associated with preconfigured uplink resources for the UE; transmitting, to the UE via the base station, a UE identifier reallocation message indicating to the UE to replace the first UE identifier with a second UE identifier; and transmitting, to the base station, a request to update the first UE identifier to the second UE identifier for the preconfigured uplink resources.

In some aspects, a UE for wireless communication may include memory and one or more processors operatively coupled to the memory. The memory and the one or more processors may be configured to transmit, to a base station, a connection request that indicates a first UE identifier for preconfigured uplink resources; receive, from the base station, a configuration for the preconfigured uplink resources; receive a UE identifier reallocation message indicating to the UE to replace the first UE identifier with a second UE identifier; and transmit, to the base station, a request to update the first UE identifier to the second UE identifier for the preconfigured uplink resources based at least in part on receiving the UE identifier reallocation message.

In some aspects, a UE for wireless communication may include memory and one or more processors operatively coupled to the memory. The memory and the one or more processors may be configured to transmit, to a base station, a connection request that indicates a UE identifier that identifies the UE in a core network; receive, from the base station, a configuration for PUR, wherein the configuration indicates an uplink resource and a PUR identifier; and transmit, to the base station, a preconfigured uplink message in the uplink resource, wherein the preconfigured uplink message includes uplink data, the UE identifier, and the PUR identifier.

In some aspects, a base station for wireless communication may include memory and one or more processors operatively coupled to the memory. The memory and the one or more processors may be configured to receive, from a UE, a connection request that indicates a first UE identifier for preconfigured uplink resources; transmit, to the UE, a configuration for the preconfigured uplink resources; receive a request to update the first UE identifier to a second UE identifier for the preconfigured uplink resources; and update, in a memory of the base station that stores context associated with the preconfigured uplink resources, the first UE identifier to the second UE identifier based at least in part on receiving the request to update the first UE identifier to the second UE identifier.

In some aspects, a base station for wireless communication may include memory and one or more processors operatively coupled to the memory. The memory and the one or more processors may be configured to receive, from a UE, a connection request that indicates a UE identifier that identifies the UE in a core network; transmit, to the UE, a configuration for PUR, wherein the configuration indicates an uplink resource and a PUR identifier; and receive, from the UE, a preconfigured uplink message in the uplink resource, wherein the preconfigured uplink message includes uplink data, the UE identifier, and the PUR identifier.

In some aspects, a core network device may include memory and one or more processors operatively coupled to the memory. The memory and the one or more processors may be configured to set up a connection with a base station, wherein the connection is associated with a UE and a first UE identifier that identifies the UE in a core network and that is associated with preconfigured uplink resources for the UE; transmit, to the UE via the base station, a UE identifier reallocation message indicating to the UE to replace the first UE identifier with a second UE identifier; and transmit, to the base station, a request to update the first UE identifier to the second UE identifier for the preconfigured uplink resources.

In some aspects, a non-transitory computer-readable medium may store one or more instructions for wireless communication. The one or more instructions, when executed by one or more processors of a UE, may cause the one or more processors to: transmit, to a base station, a connection request that indicates a first UE identifier for preconfigured uplink resources; receive, from the base station, a configuration for the preconfigured uplink resources; receive a UE identifier reallocation message indicating to the UE to replace the first UE identifier with a second UE identifier; and transmit, to the base station, a request to update the first UE identifier to the second UE identifier for the preconfigured uplink resources based at least in part on receiving the UE identifier reallocation message.

In some aspects, a non-transitory computer-readable medium may store one or more instructions for wireless communication. The one or more instructions, when executed by one or more processors of a UE, may cause the one or more processors to: transmit, to a base station, a connection request that indicates a UE identifier that identifies the UE in a core network; receive, from the base station, a configuration for PUR, wherein the configuration indicates an uplink resource and a PUR identifier; and transmit, to the base station, a preconfigured uplink message in the uplink resource, wherein the preconfigured uplink message includes uplink data, the UE identifier, and the PUR identifier.

In some aspects, a non-transitory computer-readable medium may store one or more instructions for wireless communication. The one or more instructions, when executed by one or more processors of a base station, may cause the one or more processors to: receive, from a UE, a connection request that indicates a first UE identifier for preconfigured uplink resources; transmit, to the UE, a configuration for the preconfigured uplink resources; receive a request to update the first UE identifier to a second UE identifier for the preconfigured uplink resources; and update, in a memory of the base station that stores context associated with the preconfigured uplink resources, the first UE identifier to the second UE identifier based at least in part on receiving the request to update the first UE identifier to the second UE identifier.

In some aspects, a non-transitory computer-readable medium may store one or more instructions for wireless communication. The one or more instructions, when executed by one or more processors of a base station, may cause the one or more processors to: receive, from a UE, a connection request that indicates a UE identifier that identifies the UE in a core network; transmit, to the UE, a configuration for PUR, wherein the configuration indicates an uplink resource and a PUR identifier; and receive, from the UE, a preconfigured uplink message in the uplink resource, wherein the preconfigured uplink message includes uplink data, the UE identifier, and the PUR identifier.

In some aspects, a non-transitory computer-readable medium may store one or more instructions. The one or more instructions, when executed by one or more processors of a core network device, may cause the one or more processors to: set up a connection with a base station, wherein the connection is associated with a UE and a first UE identifier that identifies the UE in a core network and that is associated with preconfigured uplink resources for the UE; transmit, to the UE via the base station, a UE identifier reallocation message indicating to the UE to replace the first UE identifier with a second UE identifier; and transmit, to the base station, a request to update the first UE identifier to the second UE identifier for the preconfigured uplink resources.

In some aspects, an apparatus for wireless communication may include means for transmitting, to a base station, a connection request that indicates a first UE identifier for preconfigured uplink resources; means for receiving, from the base station, a configuration for the preconfigured uplink resources; means for receiving a UE identifier reallocation message indicating to the apparatus to replace the first UE identifier with a second UE identifier; and means for transmitting, to the base station, a request to update the first UE identifier to the second UE identifier for the preconfigured uplink resources based at least in part on receiving the UE identifier reallocation message.

In some aspects, an apparatus for wireless communication may include means for transmitting, to a base station, a connection request that indicates a UE identifier that identifies the apparatus in a core network; means for receiving, from the base station, a configuration for PUR, wherein the configuration indicates an uplink resource and a PUR identifier; and means for transmitting, to the base station, a preconfigured uplink message in the uplink resource, wherein the preconfigured uplink message includes uplink data, the UE identifier, and the PUR identifier.

In some aspects, an apparatus for wireless communication may include means for receiving, from a UE, a connection request that indicates a first UE identifier for preconfigured uplink resources; means for transmitting, to the UE, a configuration for the preconfigured uplink resources; means for receiving a request to update the first UE identifier to a second UE identifier for the preconfigured uplink resources; and means for updating, in a memory of the apparatus that stores context associated with the preconfigured uplink resources, the first UE identifier to the second UE identifier based at least in part on receiving the request to update the first UE identifier to the second UE identifier.

In some aspects, an apparatus for wireless communication may include means for receiving, from a UE, a connection request that indicates a UE identifier that identifies the UE in a core network; means for transmitting, to the UE, a configuration for PUR, wherein the configuration indicates an uplink resource and a PUR identifier; and means for receiving, from the UE, a preconfigured uplink message in the uplink resource, wherein the preconfigured uplink message includes uplink data, the UE identifier, and the PUR identifier.

In some aspects, an apparatus may include means for setting up a connection with a base station, wherein the connection is associated with a UE and a first UE identifier that identifies the UE in a core network and that is associated with preconfigured uplink resources for the UE; means for transmitting, to the UE via the base station, a UE identifier reallocation message indicating to the UE to replace the first UE identifier with a second UE identifier; and means for transmitting, to the base station, a request to update the first UE identifier to the second UE identifier for the preconfigured uplink resources.

In some aspects, a method of wireless communication, performed by a UE, may include transmitting, to a base station, a connection request that indicates a first UE identifier that identifies the UE in a core network; receiving, from the base station, a configuration for PUR, wherein the configuration indicates an uplink resource and a PUR identifier that is a different type of identifier than the first UE identifier; and communicating with the base station based at least in part on the configuration.

In some aspects, a method of wireless communication, performed by a base station, may include receiving, from a UE, a connection request that indicates a first UE identifier that identifies the UE in a core network; transmitting, to the UE, a configuration for PUR, wherein the configuration indicates an uplink resource and a PUR identifier that is a different type of identifier than the first UE identifier; and communicating with the UE based at least in part on the configuration.

In some aspects, a UE for wireless communication may include memory and one or more processors operatively coupled to the memory. The memory and the one or more processors may be configured to transmit, to a base station, a connection request that indicates a first UE identifier that identifies the UE in a core network; receive, from the base station, a configuration for PUR, wherein the configuration indicates an uplink resource and a PUR identifier that is a different type of identifier than the first UE identifier; and communicate with the base station based at least in part on the configuration.

In some aspects, a base station for wireless communication may include memory and one or more processors operatively coupled to the memory. The memory and the one or more processors may be configured to receive, from a UE, a connection request that indicates a first UE identifier that identifies the UE in a core network; transmit, to the UE, a configuration for PUR, wherein the configuration indicates an uplink resource and a PUR identifier that is a different type of identifier than the first UE identifier; and communicate with the UE based at least in part on the configuration.

In some aspects, a non-transitory computer-readable medium may store one or more instructions for wireless communication. The one or more instructions, when executed by one or more processors of a UE, may cause the one or more processors to transmit, to a base station, a connection request that indicates a first UE identifier that identifies the UE in a core network; receive, from the base station, a configuration for PUR, wherein the configuration indicates an uplink resource and a PUR identifier that is a different type of identifier than the first UE identifier; and communicate with the base station based at least in part on the configuration.

In some aspects, a non-transitory computer-readable medium may store one or more instructions for wireless communication. The one or more instructions, when executed by one or more processors of a base station, may cause the one or more processors to receive, from a UE, a connection request that indicates a first UE identifier that identifies the UE in a core network; transmit, to the UE, a configuration for PUR, wherein the configuration indicates an uplink resource and a PUR identifier that is a different type of identifier than the first UE identifier; and communicate with the UE based at least in part on the configuration.

In some aspects, an apparatus for wireless communication may include means for transmitting, to a base station, a connection request that indicates a first UE identifier that identifies the apparatus in a core network; means for receiving, from the base station, a configuration for PUR, wherein the configuration indicates an uplink resource and a PUR identifier that is a different type of identifier than the first UE identifier; and means for communicating with the base station based at least in part on the configuration.

In some aspects, an apparatus for wireless communication may include means for receiving, from a UE, a connection request that indicates a first UE identifier that identifies the UE in a core network; means for transmitting, to the UE, a configuration for PUR, wherein the configuration indicates an uplink resource and a PUR identifier that is a different type of identifier than the first UE identifier; and means for communicating with the UE based at least in part on the configuration.

Aspects generally include a method, apparatus, system, computer program product, non-transitory computer-readable medium, user equipment, base station, wireless communication device, core network device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
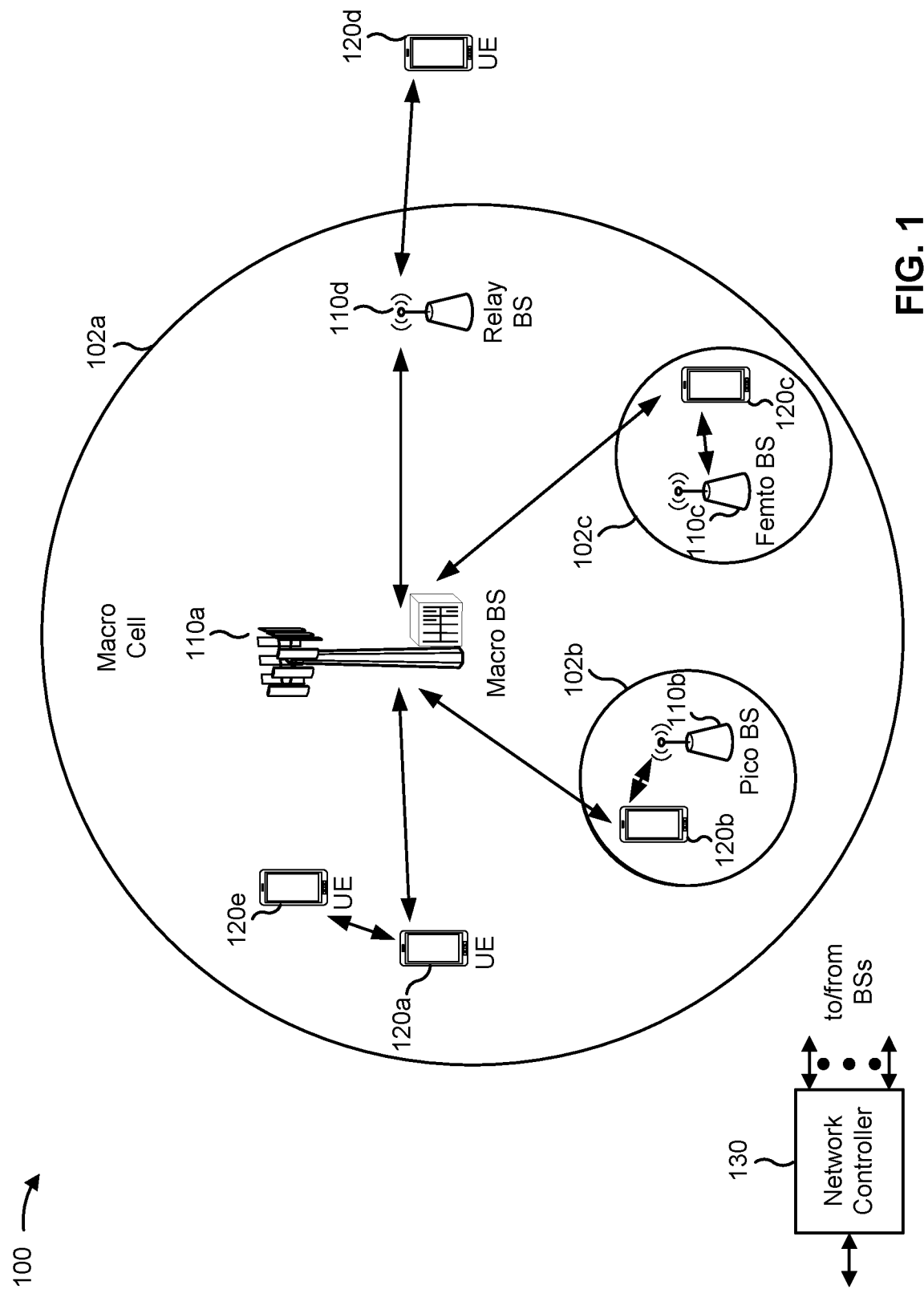
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes B Ss of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The B Ss may also communicate with one another, e.g., directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz to 300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided merely as an example. Other examples may differ from what is described with regard to FIG. 1.

Figure 2:
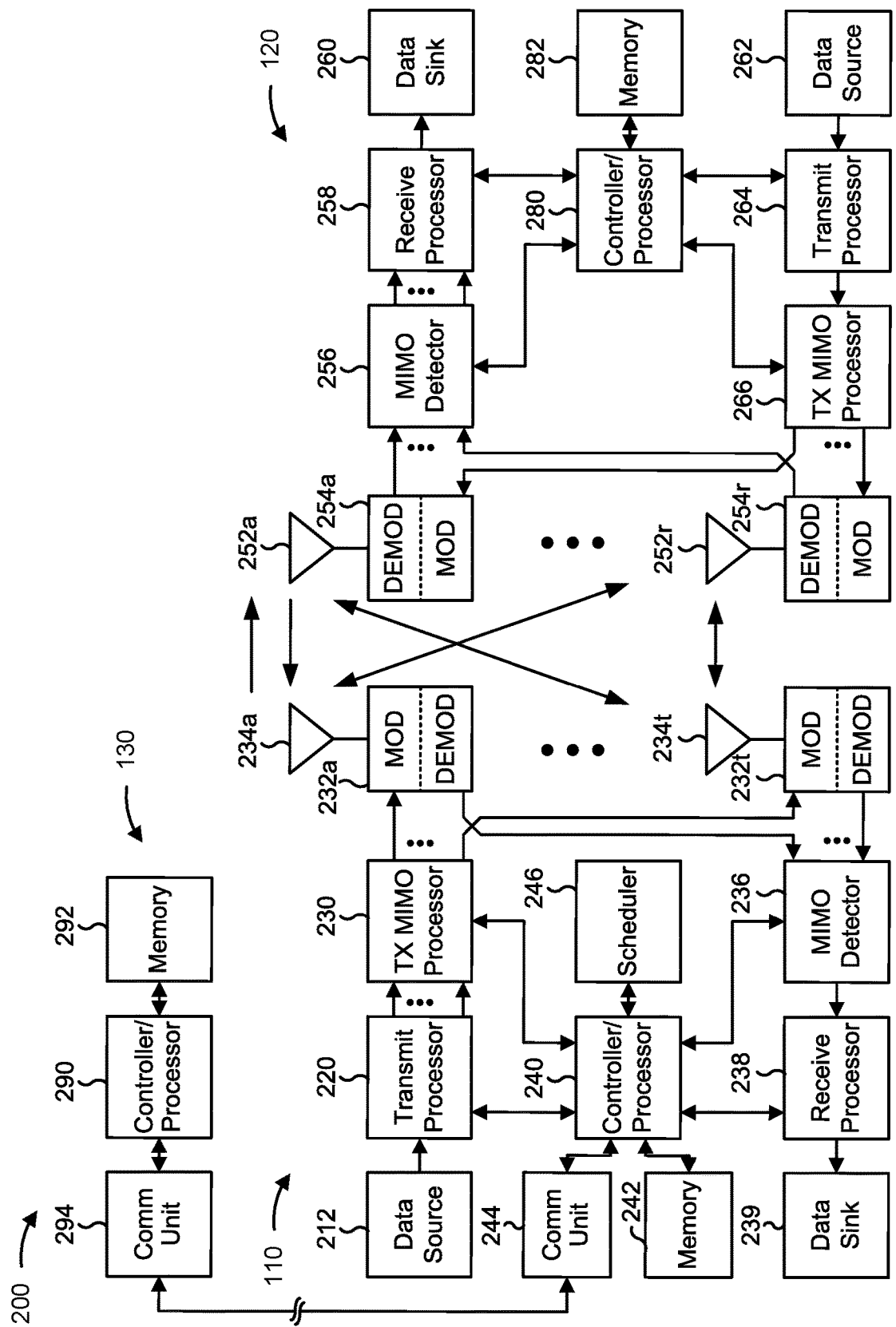
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with synchronizing a user equipment identifier for preconfigured uplink resources, as described in more detail elsewhere herein. For example, controller/processor 240 of base station 110, controller/processor 280 of UE 120, and/or any other component(s) of FIG. 2 may perform or direct operations of, for example, method 900 of FIG. 9, method 1000 of FIG. 10, method 1100 of FIG. 11, method 1200 of FIG. 12, method 1300 of FIG. 13, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Figure 3:
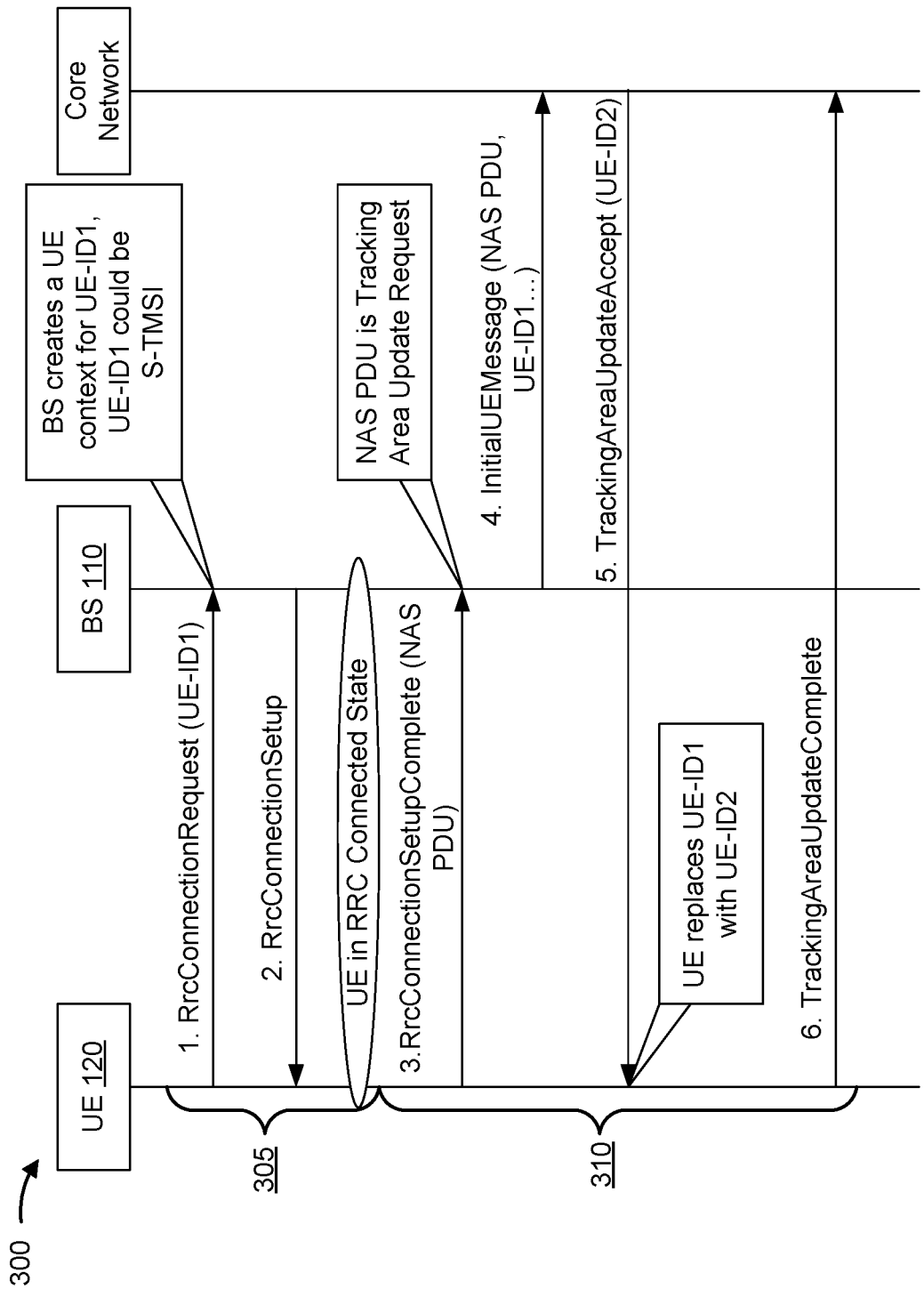
FIG. 3 is a diagram illustrating an example of a UE identifier reallocation.

FIG. 3 is a diagram illustrating an example 300 of a UE identifier reallocation.

At 305, a UE and a base station may communicate with one another to establish a radio resource control (RRC) connection. As shown, the UE may transmit a first UE identifier (shown as UE-ID1) to the base station in an RRC message (e.g., an RRC connection request). The base station may store the first UE identifier for the UE in memory of the base station, such as in association with a UE context associated with the UE. The UE context may be used to associate information with the UE using the first UE identifier, such as an RRC configuration for the UE, one or more UE capabilities of the UE, and/or the like. As shown, the first UE identifier may include a serving temporary mobile subscriber identity (S-TMSI). The base station may configure the UE for the RRC connection (e.g., in an RRC connection setup message), which may place the UE in an RRC connected state with the base station. The base station may use the first UE identifier to establish an S1 connection (e.g., an S1 application protocol (S1-AP) connection) and/or an NG connection (e.g., an NG application protocol (NG-AP) connection) with a core network entity, such as an S1-MME connection with a mobility management entity (MME). The core network entity may store the first UE identifier in memory along with a UE context for the UE, such as for mobility purposes, charging purposes, subscription purposes, and/or the like.

At 310, the UE may communicate with a core network (e.g., a network controller or another core network device or core network entity, such as an MME) via the base station to perform a tracking area update or another procedure that results in a UE identifier reallocation. For example, the UE may transmit a tracking area update (TAU) request to the base station, and the base station may transmit the TAU request to the core network. As shown, the TAU request may be transmitted by the UE to the base station in a non-access stratum (NAS) protocol data unit (PDU), and may be transmitted in an RRC connection setup complete message. As further shown, the base station may transmit the NAS PDU to the core network along with the first UE identifier (e.g., an S-TMSI) for the UE (e.g., retrieved from the UE context stored in memory of the base station).

As further shown, the core network may transmit, to the UE, a UE identifier reallocation message, shown as a TAU accept message that indicates a second UE identifier for the UE (shown as UE-ID2). Upon receiving the UE identifier reallocation message, the UE replaces the first UE identifier (UE-ID1) with the second UE identifier (UE-ID2) in memory of the UE. The UE may then signal completion of the UE identifier reallocation, such as by transmitting a TAU complete message. Although a TAU procedure is shown in FIG. 3 as an example of a UE identifier reallocation procedure, the UE identifier may be reallocated as part of one or more other procedures, such as a security procedure to update the UE identifier of the UE.

Notably, the UE identifier reallocation message is not read by the base station. As a result, the base station is unaware of the UE identifier reallocation, and continues to store the first UE identifier in the UE context for the UE. If the UE enters an RRC idle mode (e.g., due to the RRC connection being released), and then later enters the RRC connected mode, the UE will send the second UE identifier to the base station, and the base station will store the second UE identifier in association with the UE context for the UE. However, for preconfigured uplink resources (described below in connection with FIG. 4), the UE may transmit uplink data to the base station without first establishing a new RRC connection. In this case, the UE would transmit the second UE identifier along with the uplink data, but the base station would not have the second UE identifier stored in memory in association with the UE. As a result, the base station may be unable to verify the UE and/or may discard the uplink data. Some techniques and apparatuses described herein enable synchronization of a UE identifier between the UE and the base station upon UE identifier reallocation, which enables the UE to use preconfigured uplink resources to reduce latency, reduce signaling overhead, and/or the like.

As indicated above, FIG. 3 is provided merely as an example. Other examples may differ from what is described with regard to FIG. 3.

Figure 4:
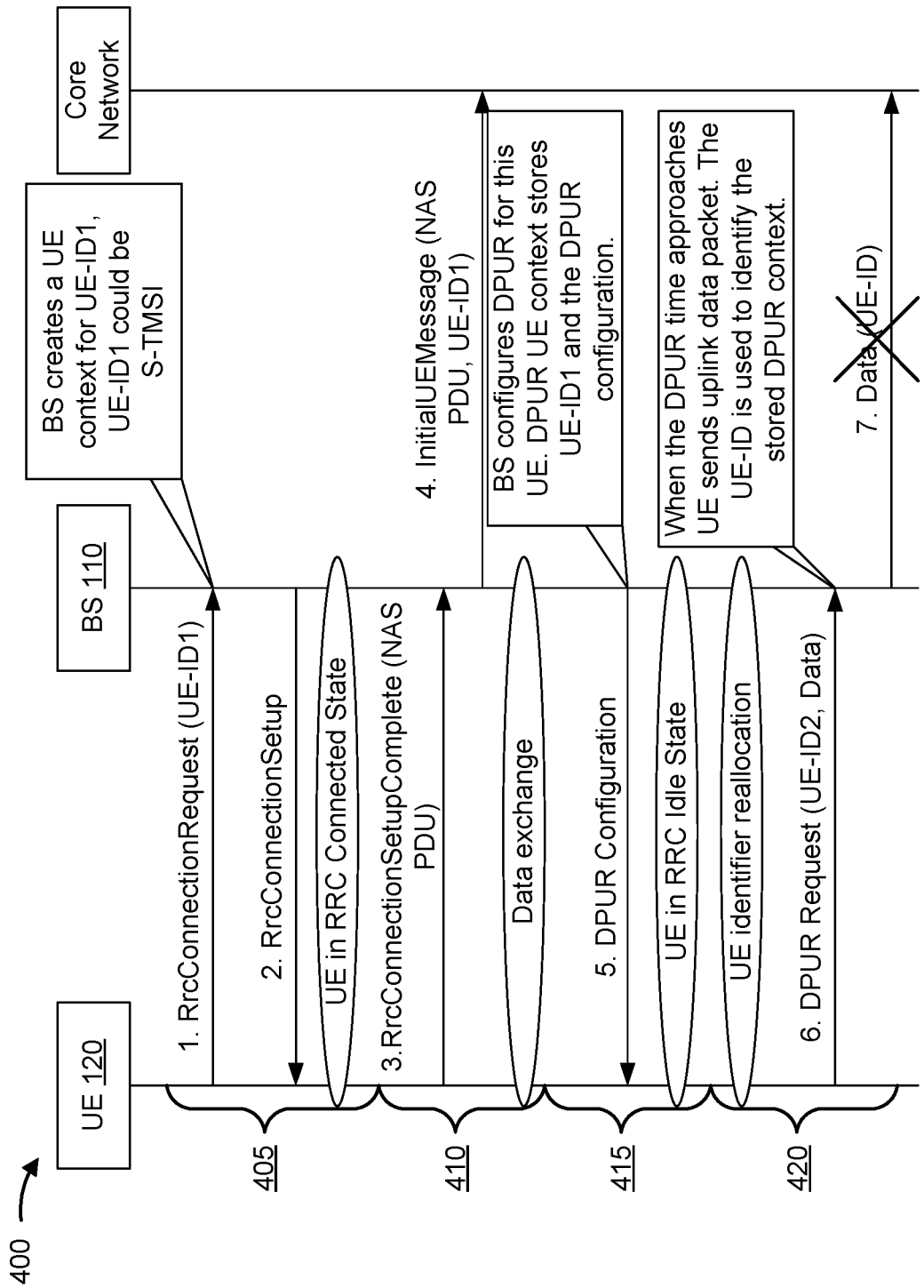
FIG. 4 is a diagram illustrating an example of configuring and using preconfigured uplink resources.

FIG. 4 is a diagram illustrating an example 400 of configuring and using preconfigured uplink resources.

At 405, a UE and a base station may communicate with one another to establish an RRC connection. As shown, the UE may transmit a first UE identifier (shown as UE-ID1) to the base station in an RRC message (e.g., an RRC connection request). The base station may store the first UE identifier for the UE in memory of the base station, such as in association with a UE context associated with the UE. The UE context may be used to associate information with the UE using the first UE identifier, such as an RRC configuration for the UE, one or more UE capabilities of the UE, and/or the like. As shown, the first UE identifier may include an S-TMSI. The base station may configure the UE for the RRC connection (e.g., in an RRC connection setup message), which may place the UE in an RRC connected state with the base station. The base station may use the first UE identifier to establish an S1 connection (e.g., an S1-AP connection) and/or an NG connection (e.g., an NG-AP connection), such as an S1-MME connection with an MME. The core network entity may store the first UE identifier in memory along with a UE context for the UE, such as for mobility purposes, charging purposes, subscription purposes, and/or the like.

At 410, the UE may communicate with a core network (e.g., a network controller or another core network device or core network entity, such as an MME) via the base station to send a NAS PDU to the core network. As shown, the NAS PDU may be transmitted by the UE to the base station, and may be transmitted in an RRC connection setup complete message. As further shown, the base station may transmit the NAS PDU to the core network along with the first UE identifier (e.g., an S-TMSI) for the UE (e.g., retrieved from the UE context stored in memory of the base station). The UE and the base station may then communicate with one another, such as by exchanging data (e.g., uplink data and/or downlink data).

At 415, the base station may configure the UE with preconfigured uplink resources (PUR), shown as dedicated preconfigured uplink resources (DPUR). The PUR may include one or more time resources, one or more frequency resources, and/or a transport block (TB) size allocated to the UE for uplink communications (e.g., uplink data). The PUR may include one or more periodic resources. The UE may use the PUR to transmit uplink data without first requesting and receiving an uplink grant for the uplink data, thereby reducing latency and signaling overhead. Furthermore, the UE may be permitted to transmit uplink data using the PUR while in an RRC idle mode, without first establishing an RRC connection and entering an RRC connected mode, thereby further conserving signaling overhead and reducing battery consumption of the UE. The base station may determine a PUR configuration for the UE (e.g., a set of resources), and may transmit the PUR configuration to the UE. As further shown, the base station may store the PUR configuration and the first UE identifier in a PUR context for the UE, which may be stored in memory of the base station. As shown, after the PUR configuration, the UE may enter an RRC idle state.

At 420, the UE may undergo a UE identifier reallocation procedure, such as the TAU procedure described above in connection with FIG. 3 or another UE identifier reallocation procedure. The UE identifier reallocation procedure may allocate a second UE identifier (UE-ID2) to the UE, and the second UE identifier may replace the first UE identifier (UE-ID1). After the UE reallocation procedure, the UE may transmit uplink data to the base station using PUR (e.g., using one or more resources preconfigured for uplink data). For example, the UE may transmit a PUR request to the base station, which may include the uplink data. Because the UE has been reallocated with the second UE identifier, the UE may include the second UE identifier (UE-ID2) in the PUR request. However, because the UE does not need to enter an RRC connected state to transmit the PUR request, the base station has not been notified of the second UE identifier that is now associated with the UE. As a result, the base station is unable to identify the PUR context associated with the UE, and so may discard the uplink data.

Some techniques and apparatuses described herein enable synchronization of a UE identifier between the UE and the base station upon UE identifier reallocation, which enables the UE to use preconfigured uplink resources to reduce latency, reduce signaling overhead, and/or the like. For example, some techniques and apparatuses described herein enable the UE to use PUR when a UE identifier reallocation occurs between PUR configuration and use of the PUR by the UE to transmit uplink data.

As indicated above, FIG. 4 is provided merely as an example. Other examples may differ from what is described with regard to FIG. 4.

Figure 5:
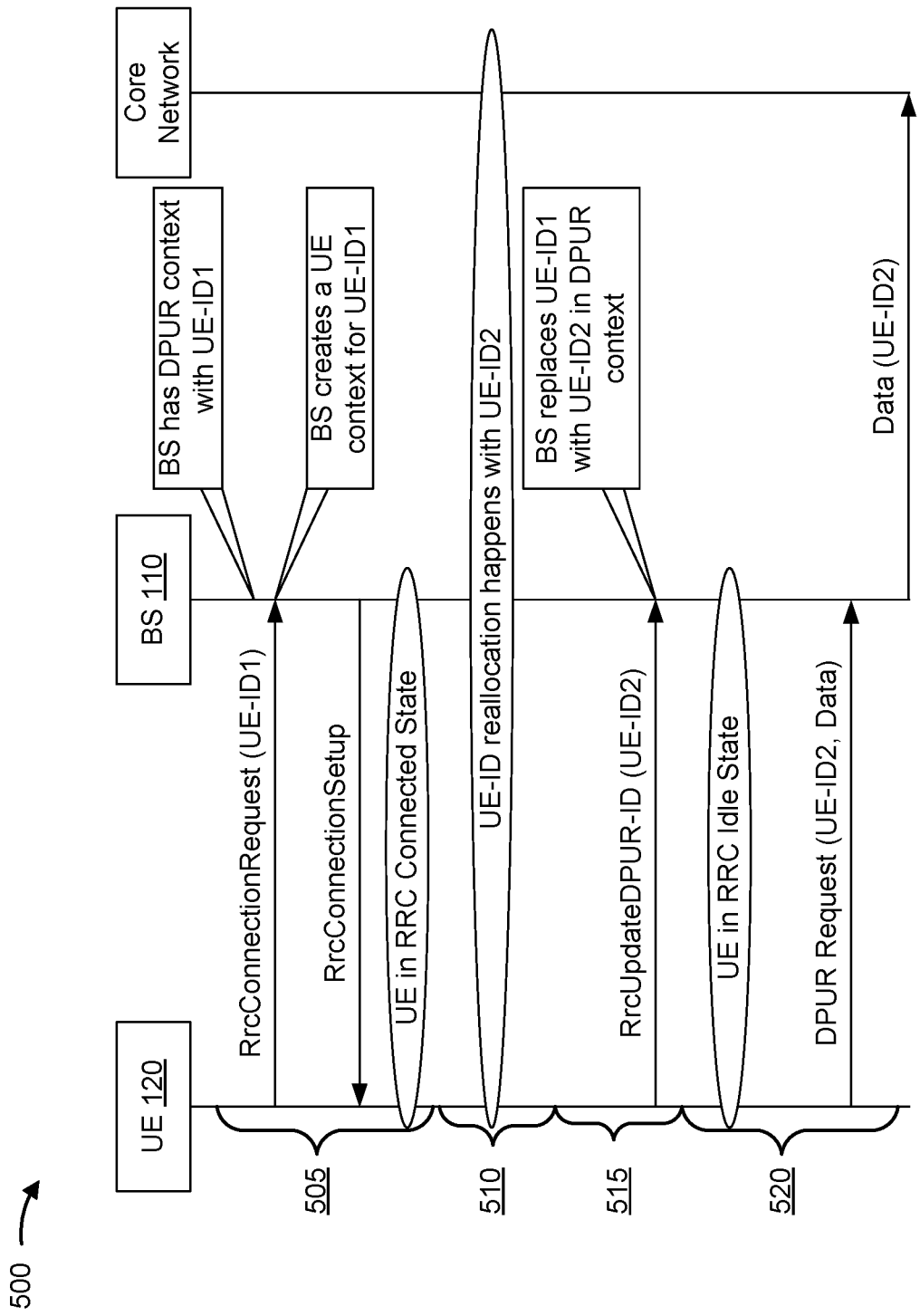
FIGS. 5-8 are diagrams illustrating examples of synchronizing a UE identifier for preconfigured uplink resources.

FIG. 5 is a diagram illustrating an example 500 of synchronizing a UE identifier for preconfigured uplink resources.

At 505, the UE 120 and the base station 110 may communicate with one another to establish an RRC connection, and the base station 110 may configure the UE 120 with a PUR configuration (as described above in connection with FIG. 4). As shown, the UE 120 may transmit a first UE identifier (shown as UE-ID1) to the base station 110 in an RRC message (e.g., a connection request, such as an RRC connection request). The base station 110 may store the first UE identifier for the UE 120 in memory of the base station 110, such as in association with a UE context and/or a PUR context associated with the UE 120. Thus, the first UE identifier may be used for PUR. The first UE identifier may include, for example, a first NAS identifier, a first S-TMSI, a first 5G S-TMSI, and/or the like. The base station 110 may configure the UE 120 for the RRC connection (e.g., in an RRC connection setup message), which may place the UE 120 in an RRC connected state with the base station 110. The base station 110 may transmit the UE identifier to a core network entity to establish an S1 connection and/or an NG connection with the core network entity, such as an S1-MME connection with an MME. The core network entity may store the first UE identifier in memory along with a UE context for the UE 120, such as for mobility purposes, charging purposes, subscription purposes, and/or the like.

The base station 110 may configure the UE 120 for PUR (e.g., before or after the RRC connection is established), shown as DPUR. The PUR may include one or more time resources, one or more frequency resources, and/or a TB size allocated to the UE 120 for uplink communications (e.g., uplink data). The PUR may include one or more periodic resources. In some aspects, the PUR configuration may indicate the first UE identifier. The UE 120 may use the PUR (and the first UE identifier) to transmit uplink data without first requesting and receiving an uplink grant for the uplink data, thereby reducing latency and signaling overhead. Furthermore, the UE 120 may be permitted to transmit uplink data using the PUR while in an RRC idle mode, without first establishing an RRC connection and entering an RRC connected mode, thereby further conserving signaling overhead and reducing battery consumption of the UE 120. The base station 110 may determine a PUR configuration for the UE 120 (e.g., a set of resources), and may transmit the PUR configuration to the UE 120. As further shown, the base station 110 may store the PUR configuration and the first UE identifier in a PUR context for the UE 120, which may be stored in memory of the base station 110. In some aspects, the base station 110 may transmit the PUR configuration in an RRC message.

At 510, the UE 120 may undergo a UE identifier reallocation procedure, such as the TAU procedure described above in connection with FIG. 3 or another UE identifier reallocation procedure. For example, the UE 120 may receive (e.g., from a core network entity) a UE identifier reallocation message (e.g., a TAU accept message or another message). The UE identifier reallocation procedure may allocate a second UE identifier (UE-ID2) to the UE 120, and the second UE identifier may replace the first UE identifier (UE-ID1). For example, the UE identifier reallocation message may indicate to the UE 120 and/or may instruct the UE 120 to update a stored UE identifier (e.g., to replace the first UE identifier with a second UE identifier). The UE 120 may replace, in memory of the UE 120, the first UE identifier with the second UE identifier. The second UE identifier may include, for example, a second NAS identifier, a second S-TMSI, a second 5G S-TMSI, and/or the like.

At 515, the UE 120 may transmit, to the base station 110, a request to update the first UE identifier to the second UE identifier for the PUR. In some aspects, the UE 120 may transmit the request based at least in part on receiving the UE identifier reallocation message. Additionally, or alternatively, the UE 120 may transmit the request based at least in part on receiving the PUR configuration. In some aspects, if the UE 120 is not configured with a PUR configuration, then the UE 120 may refrain from transmitting the request to the base station 110. As shown, the UE 120 may transmit the request in an RRC message, such as an RRC update message to update a UE identifier used for PUR (shown as RrcUpdateDPUR-ID). The request may include the second UE identifier (UE-ID2). As shown, the base station 110 may update information stored in memory of the base station 110 (e.g., a PUR context) to store the second UE identifier. For example, the base station 110 may replace, in the memory, the first UE identifier with the second UE identifier based at least in part on receiving the request from the UE 120.

Although FIG. 5 shows the base station 110 receiving the request to update the first UE identifier to the second UE identifier from the UE 120, in some aspects, the base station 110 may receive the request to update the first UE identifier to the second UE identifier from a core network device (e.g., a core network entity, such as an MME, an access and mobility management function (AMF) entity, and/or the like). Additional details are described below in connection with FIG. 8.

In some aspects, the request to update the first UE identifier to the second UE identifier is a single message, shown as an RRC update message. In some aspects, the single message may be transmitted while the UE 120 is in an RRC connected state with the UE 120. In this case, the base station 110 may receive the second UE identifier, and may identify the first UE identifier to be replaced because the second UE identifier is received as part of the same RRC connection as an RRC connection in which the first UE identifier was received. Thus, the base station 110 may identify an RRC connection via which the second UE identifier is received, may identify the first UE identifier associated with the RRC connection (e.g., previously received in an RRC message of the same RRC connection), and may replace the first UE identifier with the second UE identifier in memory of the base station 110 (e.g., in a PUR context).

In some aspects, the request to update the first UE identifier to the second UE identifier includes two messages. The first message may include a request to delete the preconfigured uplink resources associated with the first UE identifier. The second message may include a second RRC connection request that indicates the second UE identifier (e.g., where a first RRC connection request indicates the first UE identifier). Additional details are described below in connection with FIG. 6.

At 520, after notifying the base station 110 of the second UE identifier, the UE 120 may transmit uplink data to the base station 110 using PUR (e.g., using one or more resources preconfigured for uplink data). In some aspects, the UE 120 may transmit the uplink data to the base station 110 after entering an RRC idle mode. As shown, the UE 120 may transmit a PUR request to the base station 110, which may include the uplink data. Because the UE 120 has been reallocated with the second UE identifier, the UE 120 may include the second UE identifier (UE-ID2) in the PUR request. Because of the request to update the first UE identifier to the second UE identifier, the base station 110 has been notified of the second UE identifier that is now associated with the UE 120. As a result, the base station 110 can identify the PUR context associated with the UE 120. The base station 110 may transmit the uplink data to the core network along with the second UE identifier. In this way, the core network may use the second UE identifier, which has been allocated to the UE 120, for subscription purposes, charging purposes, mobility purposes, and/or the like.

Because the UE 120 notifies the base station 110 of the second UE identifier after the UE identifier reallocation procedure, the UE identifier is synchronized between the UE 120 and the base station 110, which enables the UE 120 to use preconfigured uplink resources to reduce latency, reduce signaling overhead, and/or the like.

As indicated above, FIG. 5 is provided merely as an example. Other examples may differ from what is described with regard to FIG. 5.

Figure 6:
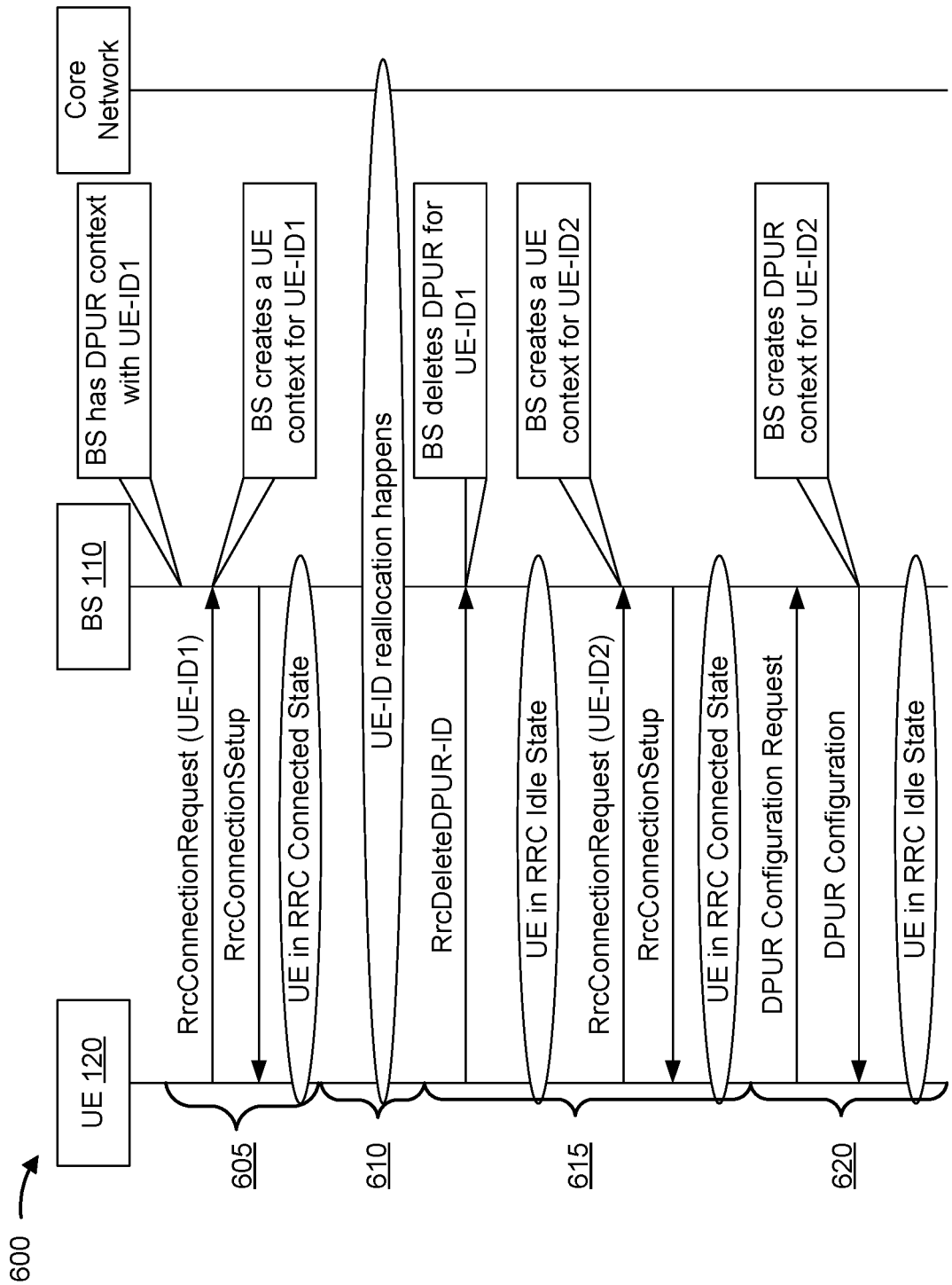

FIG. 6 is a diagram illustrating an example 600 of synchronizing a UE identifier for preconfigured uplink resources.

At 605, the UE 120 and the base station 110 may communicate with one another to establish an RRC connection (e.g., a first RRC connection), and the base station 110 may configure the UE 120 with a PUR configuration, as described above in connection with FIG. 5. As described above in connection with FIG. 5, the UE 120 may transmit a first UE identifier (shown as UE-ID1) to the base station 110, and the base station 110 may store the first UE identifier for the UE 120 in memory of the base station 110, such as in association with a UE context and/or a PUR context (e.g., a first PUR context) associated with the UE 120. In some aspects, the UE 120 may transmit the first UE identifier in a first connection request, such as a first RRC connection request. The base station 110 may transmit the UE identifier to a core network entity to establish an S1 connection and/or an NG connection with the core network entity, as described above in connection with FIG. 5. As also described above in connection with FIG. 5, the base station 110 may configure the UE 120 for PUR, and the base station 110 may store the PUR configuration and the first UE identifier in memory of the base station 110 (e.g., in a PUR context for the UE 120).

At 610, the UE 120 may undergo a UE identifier reallocation procedure and may receive a UE identifier reallocation message that instructs the UE 120 to replace the first UE identifier with a second UE identifier, as described above in connection with FIG. 5. The UE 120 may replace, in memory of the UE 120, the first UE identifier with the second UE identifier.

At 615, the UE 120 may transmit, to the base station 110, a request to update the first UE identifier to the second UE identifier for the PUR. In some aspects, the UE 120 may transmit the request based at least in part on receiving the UE identifier reallocation message. Additionally, or alternatively, the UE 120 may transmit the request based at least in part on receiving the PUR configuration. In some aspects, if the UE 120 is not configured with a PUR configuration, then the UE 120 may refrain from transmitting the request to the base station 110.

In some aspects, the request to update the first UE identifier to the second UE identifier includes two messages. As shown, the first message (e.g., an RRC message, shown as a RrcDeleteDPUR-ID) may include a request to delete the preconfigured uplink resources associated with the first UE identifier. In some aspects, the UE 120 may transmit the first message while the UE 120 is in a connected state. Based at least in part on the first message, the base station 110 may delete, from memory of the base station 110, a PUR context associated with the UE 120 (e.g., associated with the first UE identifier). As shown, the second message may include a second connection request (e.g., a second RRC connection request) that indicates the second UE identifier. As further shown, in some aspects, the UE 120 may transmit the second message after entering an RRC idle state (e.g., after the first RRC connection is released). In some aspects, the UE 120 may request that the base station 110 release the first RRC connection, and the UE 120 may enter the RRC idle state based at least in part on an RRC release message received from the base station 110. Based at least in part on the second message, the base station 110 may store a UE context associated with the second UE identifier. The base station 110 may configure the UE 120 for a second RRC connection (e.g., in an RRC connection setup message), and the UE 120 may enter an RRC connected mode.

At 620, because the previously configured PUR configuration has been deleted by the base station 110, the base station 110 may configure a new PUR configuration for the UE 120. For example, the UE 120 may transmit a PUR configuration request to the base station 110. Based at least in part on the PUR configuration request, the base station 110 may generate a second PUR configuration for the UE 120, and may store the second PUR configuration in memory in association with the second UE identifier (e.g., in a second PUR context). As shown, the base station 110 may transmit the second PUR configuration to the UE 120. The UE 120 may use the second PUR configuration to transmit uplink data as described elsewhere herein.

Because the UE 120 notifies the base station 110 of the second UE identifier after the UE identifier reallocation procedure, the UE identifier is synchronized between the UE 120 and the base station 110, which enables the UE 120 to use preconfigured uplink resources to reduce latency, reduce signaling overhead, and/or the like.

As indicated above, FIG. 6 is provided merely as an example. Other examples may differ from what is described with regard to FIG. 6.

Figure 7:
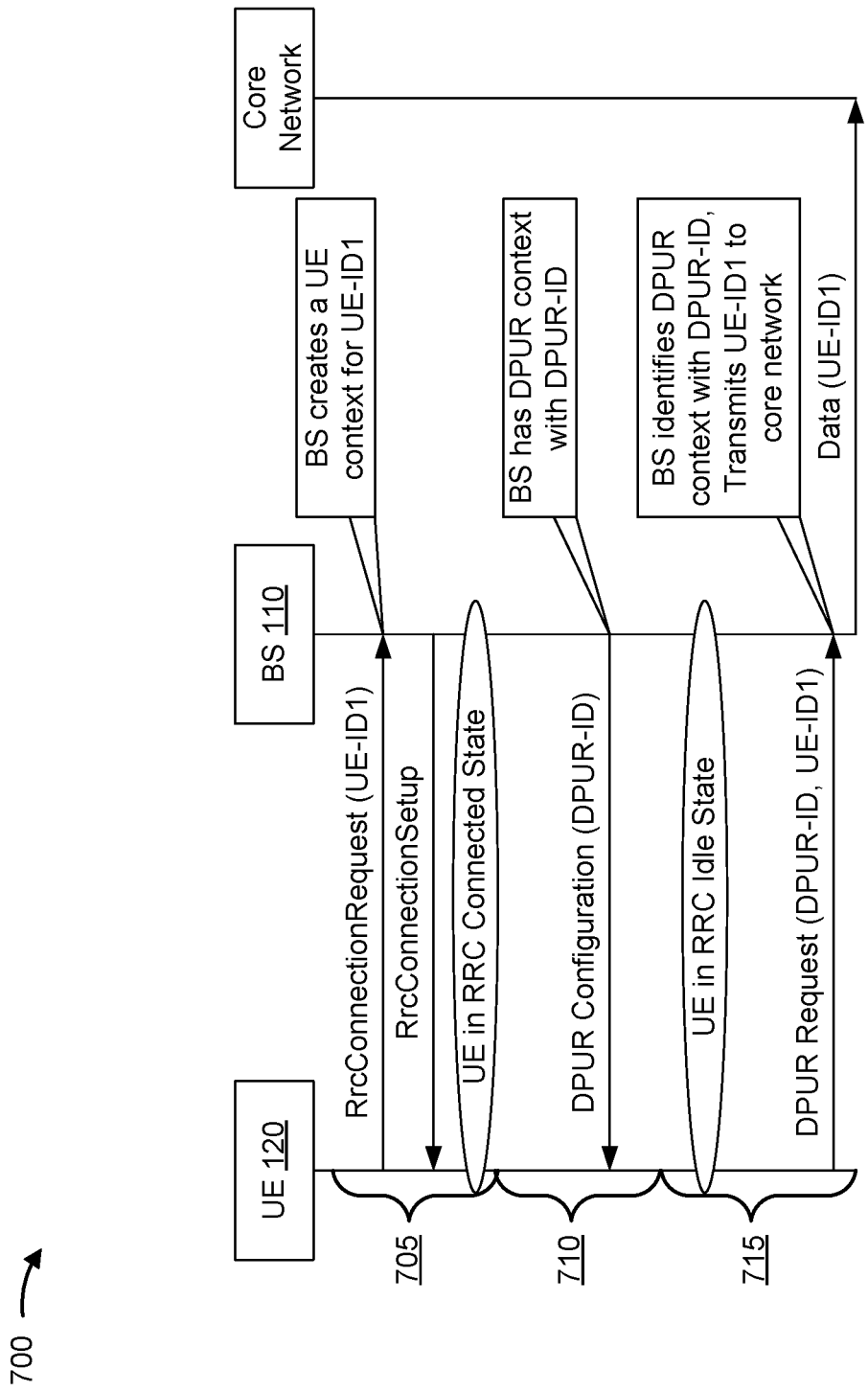

FIG. 7 is a diagram illustrating an example 700 of synchronizing a UE identifier for preconfigured uplink resources.

At 705, the UE 120 and the base station 110 may communicate with one another to establish an RRC connection. As shown, the UE 120 may transmit a UE identifier (shown as UE-ID1) to the base station 110 in an RRC message (e.g., a connection request, such as an RRC connection request). The base station 110 may store the UE identifier for the UE 120 in memory of the base station 110, such as in association with a UE context associated with the UE 120. In example 700, the base station 110 does not store the UE identifier in association with a PUR context. The UE identifier may be used to identify the UE 120 in a core network. For example, the UE identifier may include a NAS identifier, an S-TMSI, a 5G S-TMSI, and/or the like. In example 700, the UE identifier is not used for PUR.

The base station 110 may configure the UE 120 for the RRC connection (e.g., in an RRC connection setup message), which may place the UE 120 in an RRC connected state with the base station 110. The base station 110 may transmit the UE identifier to a core network entity to establish an S1 connection and/or an NG connection with the core network entity, such as an S1-MME connection with an MME. The core network entity may store the UE identifier in memory along with a UE context for the UE 120, such as for mobility purposes, charging purposes, subscription purposes, and/or the like.

At 710, the base station 110 may configure the UE 120 for PUR (e.g., before or after the RRC connection is established). As described elsewhere herein, the PUR configuration may indicate one or more time resources, one or more frequency resources, and/or a TB size allocated to the UE 120 for uplink communications (e.g., uplink data). The PUR configuration may indicate one or more periodic resources. The base station 110 may determine a PUR configuration for the UE 120 (e.g., a set of resources), and may transmit the PUR configuration to the UE 120. In example 700, the PUR configuration includes a PUR identifier (shown as DPUR-ID). The PUR identifier may be used for PUR, whereas the UE identifier may not be used for PUR. As further shown, the base station 110 may store the PUR configuration and the PUR identifier in a PUR context for the UE 120, which may be stored in memory of the base station 110. In some aspects, the base station 110 may transmit the PUR configuration in an RRC message.

In some aspects, the PUR identifier is a different type of identifier than the UE identifier. For example, the PUR identifier may be generated using a different random number generation algorithm and/or a different seed as compared to the UE identifier. Additionally, or alternatively, the PUR identifier may include a different number of bits than the UE identifier. In some aspects, the UE identifier is a NAS identifier, and the PUR identifier is not a NAS identifier. In some aspects, the UE identifier is an S-TMSI, and the PUR identifier is not an S-TMSI. In some aspects, the UE identifier is a 5G S-TMSI, and the PUR identifier is not a 5G S-TMSI. In some aspects, the UE identifier is a NAS identifier used in connection with a NAS protocol, and/or the PUR identifier is a RAN identifier used in connection with a RAN protocol.

Alternatively, in some aspects, the PUR identifier and the UE identifier may be the same type of identifier, but may have different values. For example, the UE identifier may be a NAS identifier having a first value (e.g., a first NAS identifier), and the PUR identifier may be a NAS identifier having a second value (e.g., a second NAS identifier). As another example, the UE identifier may be an S-TMSI having a first value (e.g., a first S-TMSI), and the PUR identifier may be an S-TMSI having a second value (e.g., a second S-TMSI). As another example, the UE identifier may be a 5G S-TMSI having a first value (e.g., a first 5G S-TMSI), and the PUR identifier may be a 5G S-TMSI having a second value (e.g., a second 5G S-TMSI).

In some aspects, the UE identifier may change due to a UE reallocation procedure (as described elsewhere herein), and the PUR identifier may remain the same after the UE reallocation procedure. In some aspects, the PUR identifier may change and/or be updated with transmission of a connection request (e.g., an RRC connection request), but may remain static until a subsequent connection request. For example, the PUR identifier and the UE identifier may both be UE-ID1 upon transmission of a first RRC connection request. Thereafter, if a UE identifier is reallocated, the UE identifier may be updated to UE-ID2, and the PUR identifier may remain as UE-ID1.

At 715, the UE 120 may transmit uplink data to the base station 110 using PUR (e.g., using one or more resources preconfigured for uplink data). In some aspects, the UE 120 may transmit the uplink data to the base station 110 after entering an RRC idle mode. As shown, the UE 120 may transmit a preconfigured uplink message (e.g., a PUR request) to the base station 110, which may include the uplink data. As further shown, the preconfigured uplink message may include both the PUR identifier (DPUR-ID) and the UE identifier (UE-ID1). As shown, the base station 110 may use the PUR identifier (DPUR-ID) to identify a PUR context associated with the UE 120, such as to verify the UE 120, to determine how to process the uplink data, and/or the like. As further shown, the base station 110 may transmit the uplink data to the core network along with the UE identifier (UE-ID1). In some aspects, the base station 110 may refrain from transmitting the PUR identifier to the core network (e.g., because the PUR identifier is used locally by the base station 110 and is not used by the core network). The core network may use the UE identifier for subscription purposes, charging purposes, mobility purposes, and/or the like.

Because the UE 120 and the base station 110 use separate identifiers for the UE identifier and the PUR identifier, the PUR identifier may remain synchronized between the UE 120 and the base station 110 (e.g., before and after a UE identifier reallocation procedure), which enables the UE 120 to use preconfigured uplink resources to reduce latency, reduce signaling overhead, and/or the like.

As indicated above, FIG. 7 is provided merely as an example. Other examples may differ from what is described with regard to FIG. 7.

Figure 8:
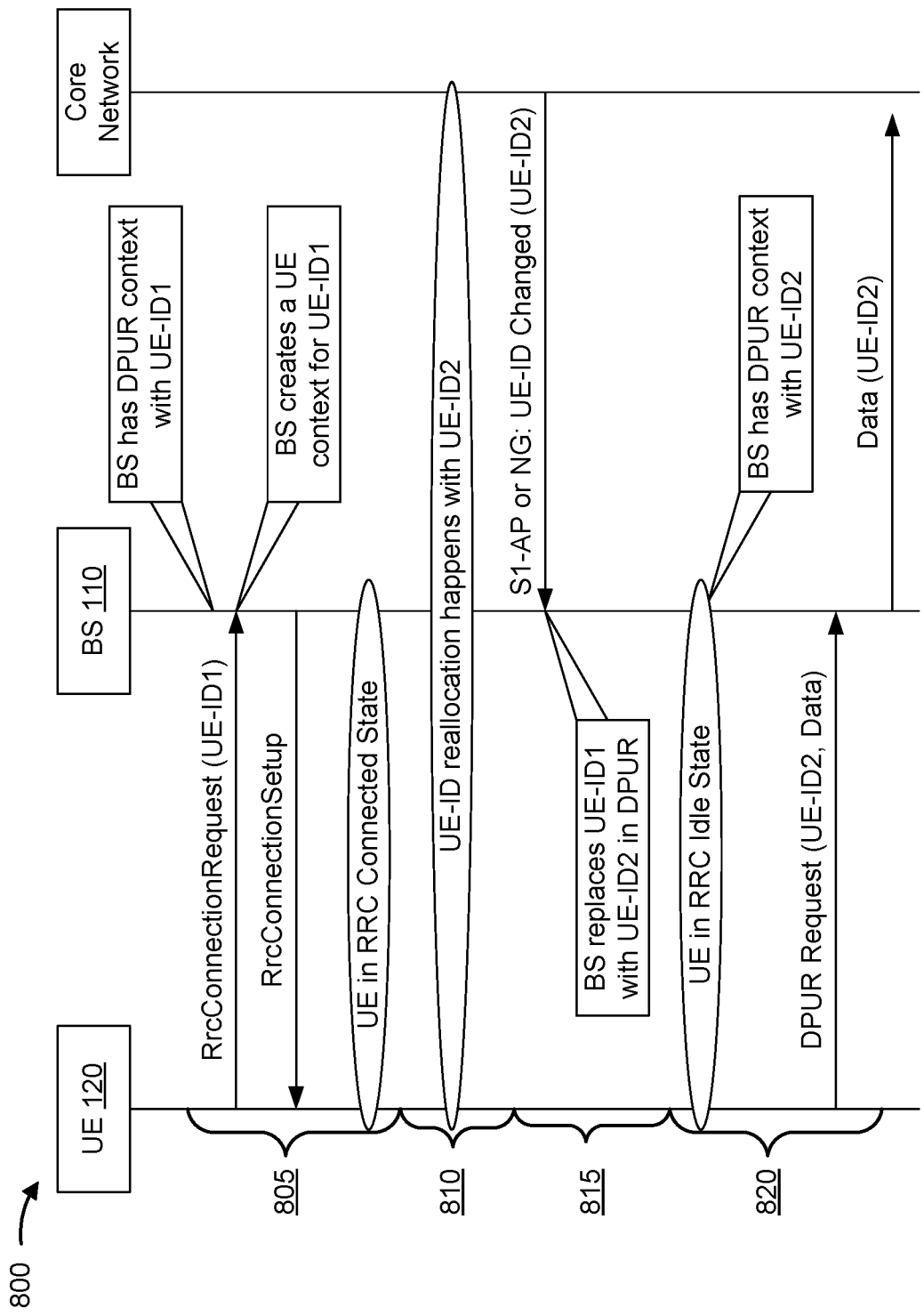

FIG. 8 is a diagram illustrating an example 800 of synchronizing a UE identifier for preconfigured uplink resources.

At 805, the UE 120 and the base station 110 may communicate with one another to establish an RRC connection, and the base station 110 may configure the UE 120 with a PUR configuration. As shown, the UE 120 may transmit a first UE identifier (shown as UE-ID1) to the base station 110 in an RRC message (e.g., a connection request, such as an RRC connection request). The base station 110 may store the first UE identifier for the UE 120 in memory of the base station 110, such as in association with a UE context and/or a PUR context associated with the UE 120. Thus, the first UE identifier may be used for PUR. The first UE identifier may include, for example, a first NAS identifier, a first S-TMSI, a first 5G S-TMSI, and/or the like. The base station 110 may configure the UE 120 for the RRC connection (e.g., in an RRC connection setup message), which may place the UE 120 in an RRC connected state with the base station 110.

The base station 110 may transmit the UE identifier to a core network entity to establish an S1 connection and/or an NG connection with the core network entity, such as an S1-MME connection with an MME. The core network entity may store the first UE identifier in memory along with a UE context for the UE 120, such as for mobility purposes, charging purposes, subscription purposes, and/or the like. Thus, the base station and the core network (e.g., a core network device and/or core network entity) may set up a connection (e.g., an S1 connection and/or an NG connection), and the connection may be associated with the UE 120 and the first UE identifier that identifies the UE 120 in the core network and that is associated with PUR for the UE 120.

The base station 110 may configure the UE 120 for PUR (e.g., before or after the RRC connection is established), shown as DPUR. The PUR may include one or more time resources, one or more frequency resources, and/or a TB size allocated to the UE 120 for uplink communications (e.g., uplink data). The PUR may include one or more periodic resources. In some aspects, the PUR configuration may indicate the first UE identifier. The UE 120 may use the PUR (and the first UE identifier) to transmit uplink data without first requesting and receiving an uplink grant for the uplink data, thereby reducing latency and signaling overhead. Furthermore, the UE 120 may be permitted to transmit uplink data using the PUR while in an RRC idle mode, without first establishing an RRC connection and entering an RRC connected mode, thereby further conserving signaling overhead and reducing battery consumption of the UE 120. The base station 110 may determine a PUR configuration for the UE 120 (e.g., a set of resources), and may transmit the PUR configuration to the UE 120. As further shown, the base station 110 may store the PUR configuration and the first UE identifier in a PUR context for the UE 120, which may be stored in memory of the base station 110. In some aspects, the base station 110 may transmit the PUR configuration in an RRC message.

At 810, the UE 120 may undergo a UE identifier reallocation procedure, such as the TAU procedure described above in connection with FIG. 3 or another UE identifier reallocation procedure. For example, the UE 120 may receive (e.g., from a core network entity) a UE identifier reallocation message (e.g., a TAU accept message or another message). The UE identifier reallocation procedure may allocate a second UE identifier (UE-ID2) to the UE 120, and the second UE identifier may replace the first UE identifier (UE-ID1). For example, the UE identifier reallocation message may indicate to the UE 120 and/or may instruct the UE 120 to update a stored UE identifier (e.g., to replace the first UE identifier with a second UE identifier). The UE 120 may replace, in memory of the UE 120, the first UE identifier with the second UE identifier. The second UE identifier may include, for example, a second NAS identifier, a second S-TMSI, a second 5G S-TMSI, and/or the like.

At 815, the core network device (e.g., an MME, an AMF entity, and/or the like) may transmit, to the base station 110, a request to update the first UE identifier to the second UE identifier for the PUR. In some aspects, the core network device may transmit the request based at least in part on transmitting the UE identifier reallocation message. As shown, the core network device may transmit the request via an S1 connection (e.g., an S1-AP connection), an NG connection (e.g., an NG-AP connection), and/or the like. The request may include the second UE identifier (UE-ID2). As shown, the base station 110 may update information stored in memory of the base station 110 (e.g., a PUR context) to store the second UE identifier. For example, the base station 110 may replace, in the memory, the first UE identifier with the second UE identifier based at least in part on receiving the request from the core network device. In some aspects, the request to update the first UE identifier to the second UE identifier is a single message from the core network device to the base station 110.

At 820, after the core network device notifies the base station 110 of the second UE identifier, the UE 120 may transmit uplink data to the base station 110 using PUR (e.g., using one or more resources preconfigured for uplink data). In some aspects, the UE 120 may transmit the uplink data to the base station 110 after entering an RRC idle mode. As shown, the UE 120 may transmit a PUR request to the base station 110, which may include the uplink data. Because the UE 120 has been reallocated with the second UE identifier, the UE 120 may include the second UE identifier (UE-ID2) in the PUR request. Because of the request to update the first UE identifier to the second UE identifier, the base station 110 has been notified of the second UE identifier that is now associated with the UE 120. As a result, the base station 110 can identify the PUR context associated with the UE 120. The base station 110 may transmit the uplink data to the core network along with the second UE identifier. In this way, the core network may use the second UE identifier, which has been allocated to the UE 120, for subscription purposes, charging purposes, mobility purposes, and/or the like.

Because the core network device notifies the base station 110 of the second UE identifier after the UE identifier reallocation procedure, the UE identifier is synchronized between the UE 120, the base station 110, and the core network device, which enables the UE 120 to use preconfigured uplink resources to reduce latency, reduce signaling overhead, and/or the like.

As indicated above, FIG. 8 is provided merely as an example. Other examples may differ from what is described with regard to FIG. 8.

Figure 9:
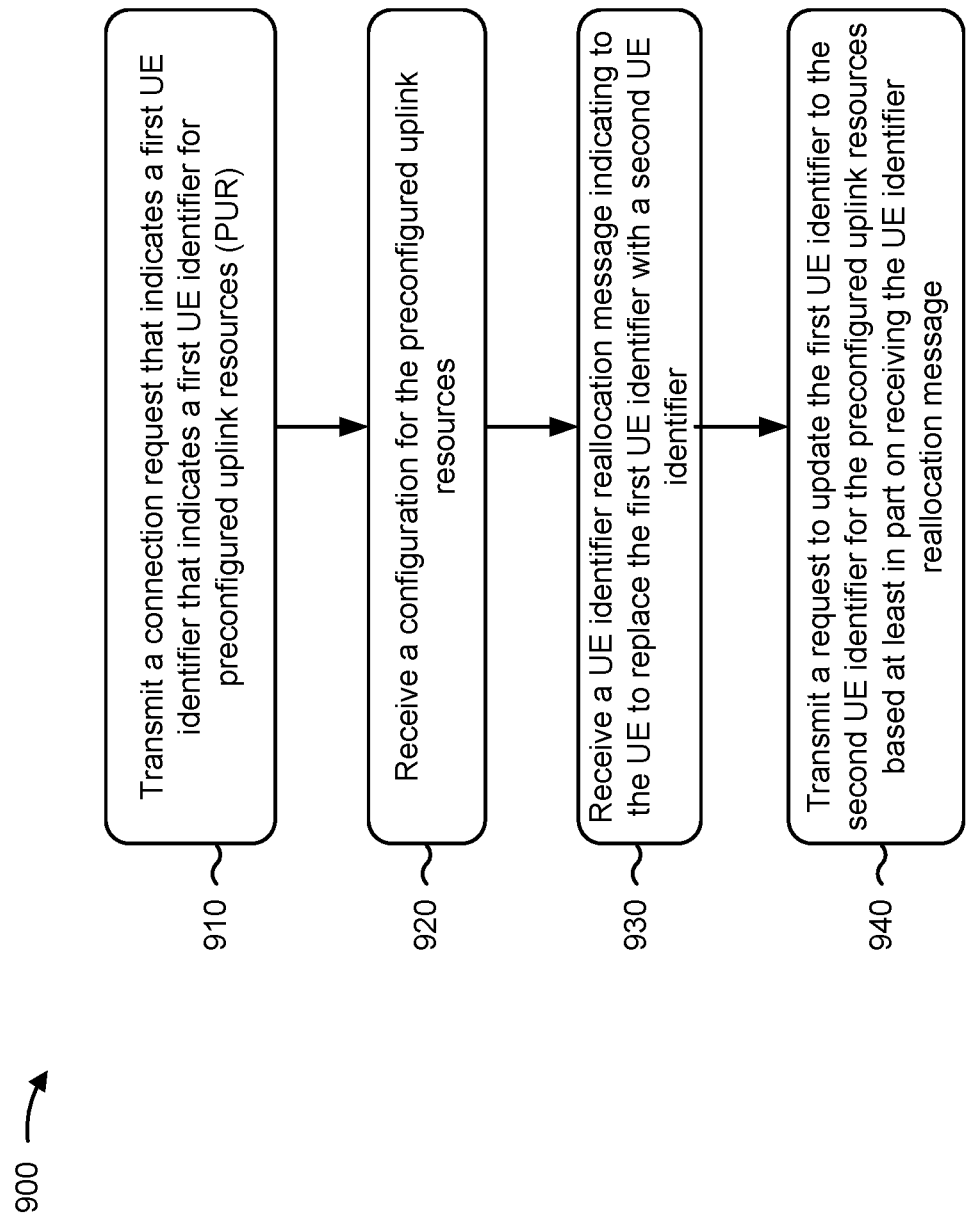
FIGS. 9-13 are flowcharts of methods of wireless communication.

FIG. 9 is a diagram illustrating an example method 900 performed, for example, by a UE, in accordance with various aspects of the present disclosure. Example method 900 is an example where the UE (e.g., UE 120, apparatus 1402, and/or the like) performs operations associated with synchronizing a user equipment identifier for preconfigured uplink resources.

In some aspects, block 910 may include transmitting, to a base station, a connection request that indicates a first UE identifier for preconfigured uplink resources. For example, the UE (e.g., using transmit processor 264, controller/processor 280, memory 282, and/or the like) may transmit, to a base station, a connection request that indicates a first UE identifier for preconfigured uplink resources, as described above. In some aspects, the connection request is transmitted in a radio resource control message. In some aspects, the first UE identifier is a first non-access stratum (NAS) identifier, a first serving temporary mobile subscriber identity (S-TMSI), or a first 5G S-TMSI (5G-S-TMSI).

In some aspects, block 920 may include receiving, from the base station, a configuration for the preconfigured uplink resources. For example, the UE (e.g., using receive processor 258, controller/processor 280, memory 282, and/or the like) may receive, from the base station, a configuration for the preconfigured uplink resources, as described above. In some aspects, the configuration is received in a radio resource control message.

In some aspects, block 930 may include receiving a UE identifier reallocation message indicating to the UE to replace the first UE identifier with a second UE identifier. For example, the UE (e.g., using receive processor 258, controller/processor 280, memory 282, and/or the like) may receive a UE identifier reallocation message indicating to the UE to replace the first UE identifier with a second UE identifier, as described above. In some aspects, the second UE identifier is a second NAS identifier, a second S-TMSI, or a second 5G S-TMSI.

In some aspects, block 940 may include transmitting, to the base station, a request to update the first UE identifier to the second UE identifier for the preconfigured uplink resources based at least in part on receiving the UE identifier reallocation message. For example, the UE (e.g., using transmit processor 264, controller/processor 280, memory 282, and/or the like) may transmit, to the base station, a request to update the first UE identifier to the second UE identifier for the preconfigured uplink resources based at least in part on receiving the UE identifier reallocation message, as described above. In some aspects, the request to update the first UE identifier to the second UE identifier for the preconfigured uplink resources is further based at least in part on receiving the configuration for the preconfigured uplink resources. In some aspects, the request to update the first UE identifier to the second UE identifier is transmitted in a radio resource control message. In some aspects, the request to update the first UE identifier to the second UE identifier is a single message transmitted while the UE is in a connected state. In some aspects, the request to update the first UE identifier to the second UE identifier includes: a request to delete the preconfigured uplink resources associated with the first UE identifier while the UE is in a connected state, and another connection request that indicates the second UE identifier.

Method 900 may include additional aspects, such as any single aspect or any combination of aspects described in connection with one or more other processes described elsewhere herein.

Although FIG. 9 shows example blocks of method 900, in some aspects, method 900 may include additional blocks, fewer blocks, different blocks, or differently arranged blocks than those depicted in FIG. 9. Additionally, or alternatively, two or more of the blocks of method 900 may be performed in parallel.

Figure 10:
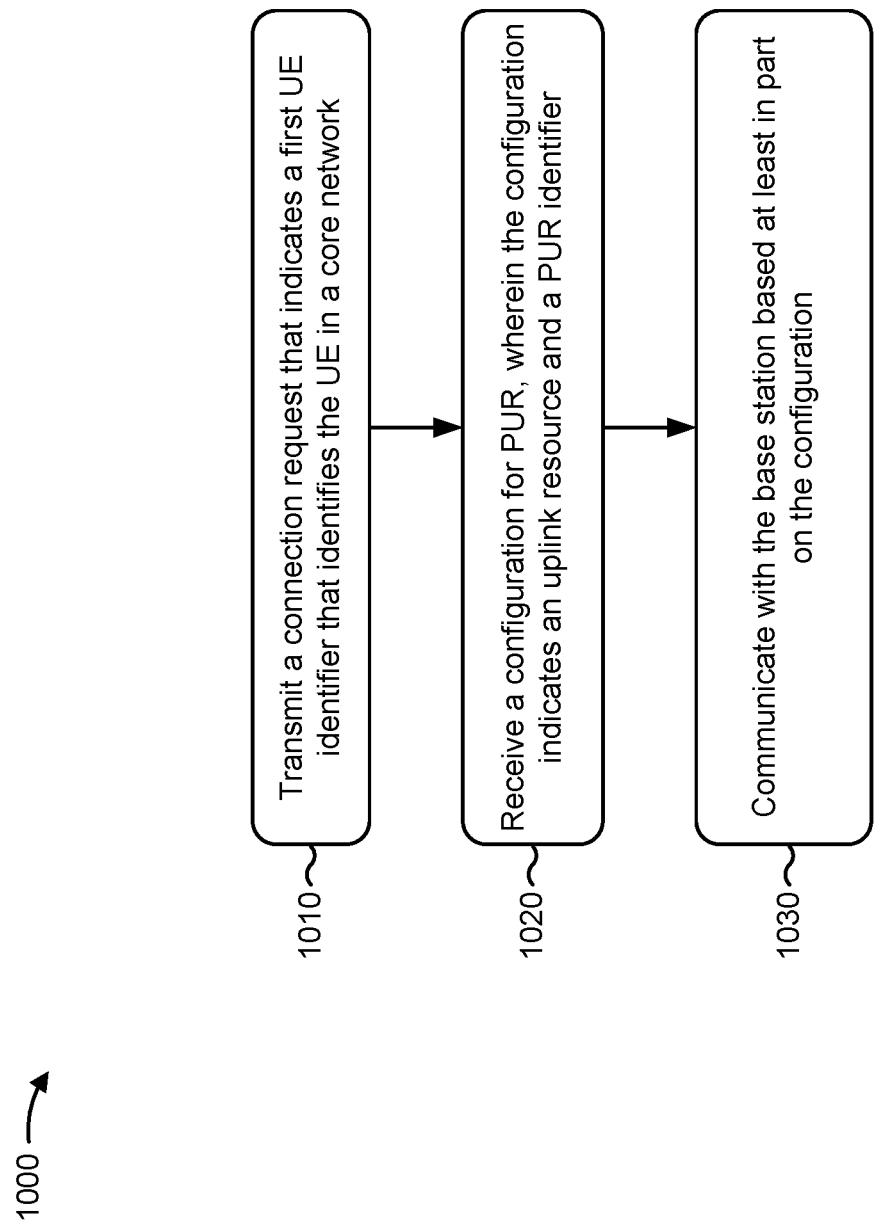

FIG. 10 is a diagram illustrating an example method 1000 performed, for example, by a UE, in accordance with various aspects of the present disclosure. Example method 1000 is an example where the UE (e.g., UE 120, apparatus 1402/1402', and/or the like) performs operations associated with synchronizing a user equipment identifier for preconfigured uplink resources.

In some aspects, block 1010 may include transmitting, to a base station, a connection request that indicates a first UE identifier that identifies the UE in a core network. For example, the UE (e.g., using transmit processor 264, controller/processor 280, memory 282, and/or the like) may transmit, to a base station, a connection request that indicates a first UE identifier that identifies the UE in a core network, as described above. In some aspects, the connection request is transmitted in an RRC message. In some aspects, the first UE identifier is an NAS identifier, an S-TMSI, or a 5G TMSI.

In some aspects, block 1020 may include receiving, from the base station, a configuration for preconfigured uplink resources (PUR), wherein the configuration indicates an uplink resource and a PUR identifier. For example, the UE (e.g., using receive processor 258, controller/processor 280, memory 282, and/or the like) may receive, from the base station, a configuration for PUR, as described above. In some aspects, the configuration indicates an uplink resource and a PUR identifier. In some aspects, the PUR identifier is a different type of identifier than the UE identifier. In some aspects, the UE identifier is a first NAS identifier, a first S-TMSI, or a first 5G S-TMSI, and the PUR identifier is a second NAS identifier, a second S-TMSI, or a second 5G S-TMSI. In some aspects, the uplink resource is a preconfigured uplink resource.

In some aspects, block 1030 may include communicating with the base station based at least in part on the configuration. For example, the UE (e.g., using transmit processor 264, controller/processor 280, memory 282, and/or the like) may communicate with the base station based at least in part on the configuration. In some aspects, communicating with the base station includes transmitting, to the base station, a preconfigured uplink message in the preconfigured uplink resource, wherein the preconfigured uplink message includes uplink data. In some aspects, the UE may transmit, to the base station, a message that includes the PUR identifier.

Method 1000 may include additional aspects, such as any single aspect or any combination of aspects described below and/or in connection with one or more other processes described elsewhere herein.

In some aspects, the UE may perform a UE identifier reallocation procedure that allocates a second UE identifier, different from the first UE identifier, to the UE. The UE may transmit, to the base station, a message that includes the PUR identifier based at least in part on performing the UE identifier reallocation procedure. In this case, the UE identifier reallocation procedure does not cause the PUR identifier to change. In this case, the first UE identifier may be a first NAS identifier, a first S-TMSI, or a first 5G S-TMSI, and the second UE identifier may be a second NAS identifier, a second S-TMSI, or a second 5G S-TMSI.

In some aspects, the UE may receive a message that causes the UE to replace the first UE identifier with a second UE identifier. The UE may transmit, to the base station, a message that includes the PUR identifier based at least in part on receiving the message that causes the UE to replace the first UE identifier with the second UE identifier. In this case, the message that causes the UE to replace the first UE identifier with the second UE identifier does not cause the PUR identifier to change. In this case, the first UE identifier may be a first NAS identifier, a first S-TMSI, or a first 5G S-TMSI, and the second UE identifier may be a second NAS identifier, a second S-TMSI, or a second 5G S-TMSI.

Although FIG. 10 shows example blocks of method 1000, in some aspects, method 1000 may include additional blocks, fewer blocks, different blocks, or differently arranged blocks than those depicted in FIG. 10. Additionally, or alternatively, two or more of the blocks of method 1000 may be performed in parallel.

Figure 11:
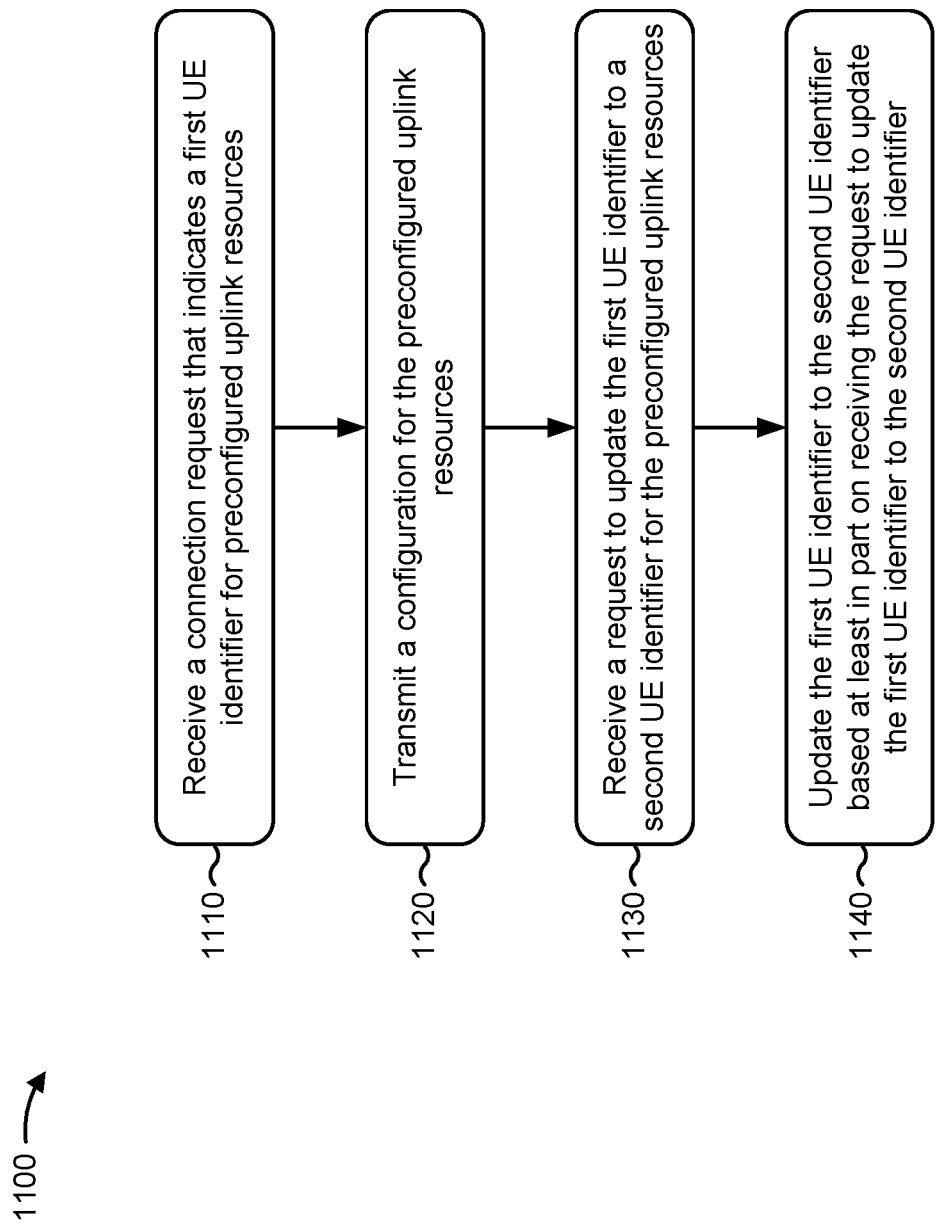

FIG. 11 is a diagram illustrating an example method 1100 performed, for example, by a base station, in accordance with various aspects of the present disclosure. Example method 1100 is an example where the base station (e.g., base station 110, apparatus 1602/1602', and/or the like) performs operations associated with synchronizing a user equipment identifier for preconfigured uplink resources.

In some aspects, block 1110 may include receiving, from a UE, a connection request that indicates a first UE identifier for preconfigured uplink resources. For example, the base station (e.g., using receive processor 238, controller/processor 240, memory 242, and/or the like) may receive, from a UE, a connection request that indicates a first UE identifier for preconfigured uplink resources, as described above. In some aspects, the connection request is received in an RRC message. In some aspects, the first UE identifier is a first NAS identifier, a first S-TMSI, or a first 5G S-TMSI.

In some aspects, block 1120 may include transmitting, to the UE, a configuration for the preconfigured uplink resources. For example, the base station (e.g., using transmit processor 220, controller/processor 240, memory 242, and/or the like) may transmit, to the UE, a configuration for the preconfigured uplink resources, as described above. In some aspects, the configuration is transmitted in an RRC message. In some aspects, the configuration indicates one or more uplink resources for the UE to transmit uplink data without first receiving a grant.

In some aspects, block 1130 may include receiving a request to update the first UE identifier to a second UE identifier for the preconfigured uplink resources. For example, the base station (e.g., using receive processor 238, controller/processor 240, memory 242, and/or the like) may receive a request to update the first UE identifier to a second UE identifier for the preconfigured uplink resources, as described above. In some aspects, the request to update the first UE identifier to the second UE identifier is received from the UE. In some aspects, the request to update the first UE identifier to the second UE identifier is received in an RRC message. In some aspects, the request to update the first UE identifier to the second UE identifier is received from a mobility management entity (MME), an access and mobility management function (AMF) entity, or another core network entity. In some aspects, the request to update the first UE identifier to the second UE identifier is an S1 application protocol message or an NG application protocol message. In some aspects, the request to update the first UE identifier to the second UE identifier is a single message received while the UE is in a connected state. In some aspects, the request to update the first UE identifier to the second UE identifier includes: a request to delete the preconfigured uplink resources associated with the first UE identifier while the UE is in a connected state, and another connection request that indicates the second UE identifier. In some aspects, the second UE identifier is a second NAS identifier, a second S-TMSI, or a second 5G S-TMSI.

In some aspects, block 1140 may include updating, in a memory of the base station that stores context associated with the preconfigured uplink resources, the first UE identifier to the second UE identifier based at least in part on receiving the request to update the first UE identifier to the second UE identifier. For example, the base station (e.g., using controller/processor 240, memory 242, and/or the like) may update the first UE identifier to the second UE identifier based at least in part on receiving the request to update the first UE identifier to the second UE identifier, as described above. In some aspects, the base station may update the first UE identifier to the second UE identifier in a memory of the base station that stores context associated with the preconfigured uplink resources. The context may include, for example, a PUR context.

Method 1100 may include additional aspects, such as any single aspect or any combination of aspects described in connection with one or more other processes described elsewhere herein.

Although FIG. 11 shows example blocks of method 1100, in some aspects, method 1100 may include additional blocks, fewer blocks, different blocks, or differently arranged blocks than those depicted in FIG. 11. Additionally, or alternatively, two or more of the blocks of method 1100 may be performed in parallel.

Figure 12:
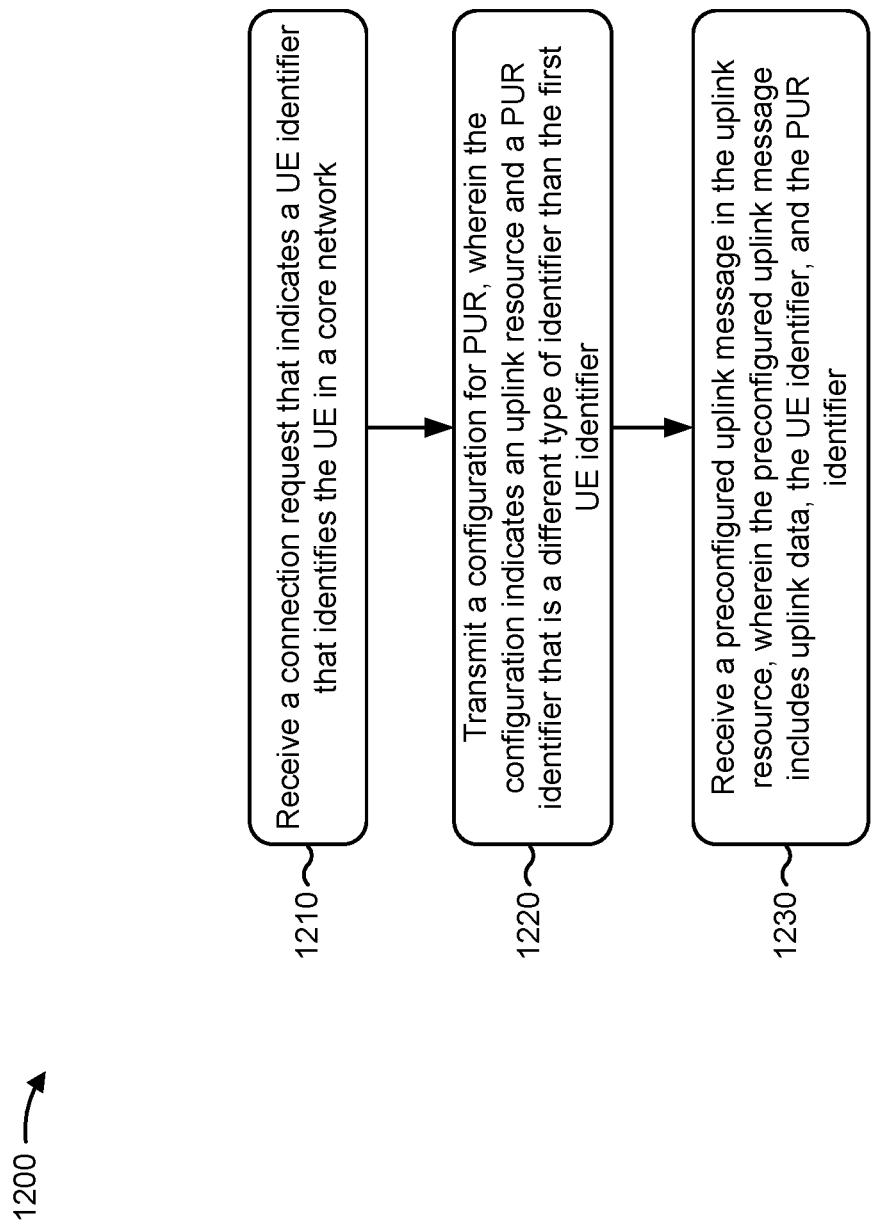

FIG. 12 is a diagram illustrating an example method 1200 performed, for example, by a base station, in accordance with various aspects of the present disclosure. Example method 1200 is an example where the base station (e.g., base station 110, apparatus 1602/1602', and/or the like) performs operations associated with synchronizing a user equipment identifier for preconfigured uplink resources.

In some aspects, block 1210 may include receiving, from a UE, a connection request that indicates a first UE identifier that identifies the UE in a core network. For example, the base station (e.g., using receive processor 238, controller/processor 240, memory 242, and/or the like) may receive, from a UE, a connection request that indicates a first UE identifier that identifies the UE in a core network, as described above. In some aspects, the connection request is received in an RRC message. In some aspects, the first UE identifier is an NAS identifier, an S-TMSI, or a 5G S-TMSI.

In some aspects, block 1220 may include transmitting, to the UE, a configuration for PUR, wherein the configuration indicates an uplink resource and a PUR identifier that is a different type of identifier than the first UE identifier. For example, the base station (e.g., using transmit processor 220, controller/processor 240, memory 242, and/or the like) may transmit, to the UE, a configuration for PUR, as described above. In some aspects, the configuration indicates an uplink resource and a PUR identifier. In some aspects, the configuration is transmitted in an RRC message. In some aspects, the PUR identifier is a different type of identifier than the first UE identifier. In some aspects, the first UE identifier is a first NAS identifier, a first S-TMSI, or a 5G S-TMSI, and the PUR identifier is a second NAS identifier, a second S-TMSI, or a second 5G S-TMSI.

In some aspects, block 1230 may include communicating with the UE based at least in part on the configuration. For example, the base station (e.g., using receive processor 238, controller/processor 240, memory 242, and/or the like) may communicate with the UE based at least in part on the configuration, as described above. In some aspects, communicating with the UE includes receiving, from the UE, a preconfigured uplink message in the preconfigured uplink resource, wherein the preconfigured uplink message includes uplink data. In some aspects, the preconfigured uplink message includes uplink data, the UE identifier, and the PUR identifier. In some aspects, the base station may identify a context associated with the preconfigured uplink resources based at least in part on the PUR identifier. The context may include, for example, a PUR context. In some aspects, the base station may receive, from the UE, a message that includes the PUR identifier.

Method 1200 may include additional aspects, such as any single aspect or any combination of aspects described below and/or in connection with one or more other processes described elsewhere herein.

In some aspects, the base station may transmit a message that causes the UE to replace the first UE identifier with a second UE identifier. The base station may receive, from the UE, a message that includes the PUR identifier based at least in part on transmitting the message that causes the UE to replace the first UE identifier with the second UE identifier. In this case, the message that causes the UE to replace the first UE identifier with the second UE identifier does not cause the PUR identifier to change. In this case, the first UE identifier is a first NAS identifier, a first S-TMSI, or a first 5G S-TMSI, and the second UE identifier is a second NAS identifier, a second S-TMSI, or a second 5G S-TMSI.

Although FIG. 12 shows example blocks of method 1200, in some aspects, method 1200 may include additional blocks, fewer blocks, different blocks, or differently arranged blocks than those depicted in FIG. 12. Additionally, or alternatively, two or more of the blocks of method 1200 may be performed in parallel.

Figure 13:
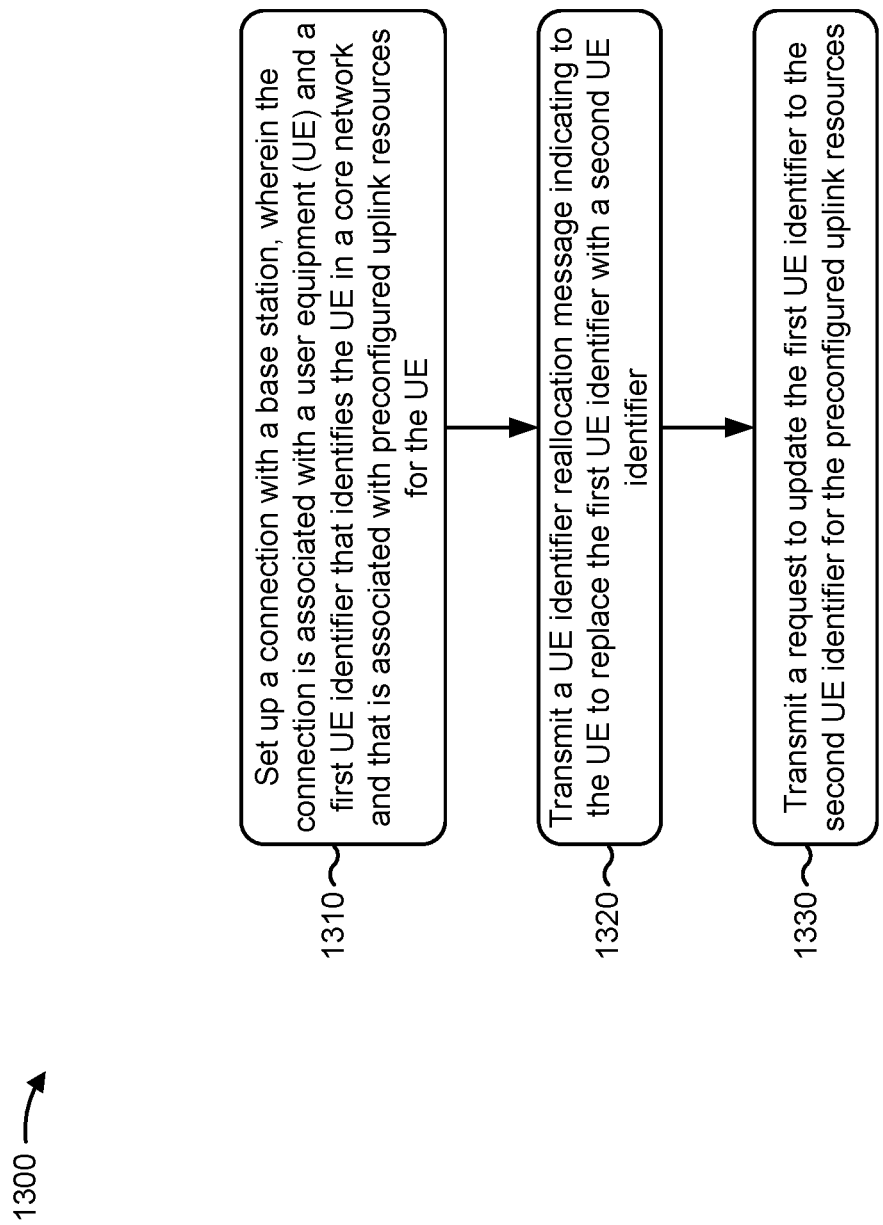

FIG. 13 is a diagram illustrating an example method 1300 performed, for example, by a core network device, in accordance with various aspects of the present disclosure. Example method 1300 is an example where the core network device (e.g., network controller 130, an MME, an AMF entity, apparatus 1802/1802', and/or the like) performs operations associated with synchronizing a user equipment identifier for preconfigured uplink resources.

In some aspects, block 1310 may include setting up a connection with a base station, wherein the connection is associated with a UE and a first UE identifier that identifies the UE in a core network and that is associated with preconfigured uplink resources for the UE. For example, the core network device (e.g., using controller/processor 290, memory 292, communication unit 294, and/or the like) may set up a connection with a base station, as described above. In some aspects, the connection is associated with a UE and a first UE identifier that identifies the UE in a core network and that is associated with preconfigured uplink resources for the UE. In some aspects, the connection is set up for an S1-AP interface and/or an NG-AP interface. For example, the connection with the base station may be an S1 application protocol connection or an NG application protocol connection. In some aspects, the core network device is a mobility management entity (MME) or an access and mobility management function (AMF) entity.

In some aspects, block 1320 may include transmitting, to the UE via the base station, a UE identifier reallocation message indicating to the UE to replace the first UE identifier with a second UE identifier. For example, the core network device (e.g., using controller/processor 290, memory 292, communication unit 294, and/or the like) may transmit, to the UE via the base station, a UE identifier reallocation message indicating to the UE to replace the first UE identifier with a second UE identifier, as described above. In some aspects, the first UE identifier is a first NAS identifier, a first S-TMSI, or a first 5G S-TMSI. In some aspects, the second UE identifier is a second NAS identifier, a second S-TMSI, or a second 5G S-TMSI.

In some aspects, block 1330 may include transmitting, to the base station, a request to update the first UE identifier to the second UE identifier for the preconfigured uplink resources. For example, the core network device (e.g., using controller/processor 290, memory 292, communication unit 294, and/or the like) may transmit, to the base station, a request to update the first UE identifier to the second UE identifier for the preconfigured uplink resources, as described above. In some aspects, the request to update the first UE identifier to the second UE identifier is transmitted via an S1 application protocol connection or an NG application protocol connection Method 1300 may include additional aspects, such as any single aspect or any combination of aspects described in connection with one or more other processes described elsewhere herein.

Although FIG. 13 shows example blocks of method 1300, in some aspects, method 1300 may include additional blocks, fewer blocks, different blocks, or differently arranged blocks than those depicted in FIG. 13. Additionally, or alternatively, two or more of the blocks of method 1300 may be performed in parallel.

Figure 14:
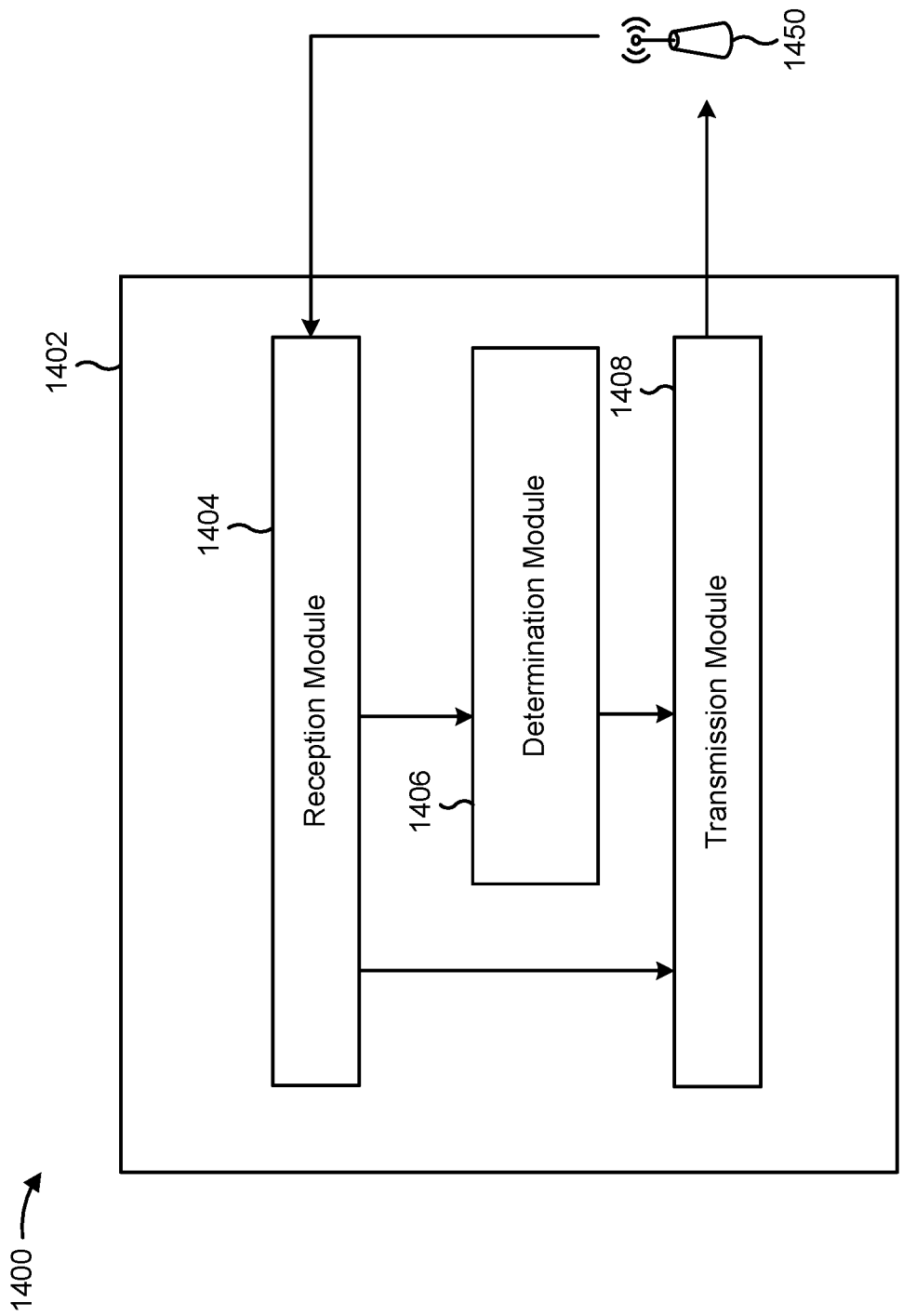
FIG. 14 is a data flow diagram illustrating data flow between different modules/means/components in an example apparatus.

FIG. 14 is a conceptual data flow diagram 1400 illustrating data flow between different modules/means/components in an example apparatus 1402. The apparatus 1402 may be a UE. In some aspects, the apparatus 1402 includes a reception module 1404, a determination module 1406, a transmission module 1408, and/or the like.

In some aspects, the transmission module 1408 may transmit, to an apparatus 1450 (e.g., a base station), a connection request that indicates a first UE identifier that identifies the apparatus 1402 in a core network. The reception module 1404 may receive, from the apparatus 1450, a configuration for the preconfigured uplink resources, wherein the configuration indicates an uplink resource and a PUR identifier that is a different type of identifier than the first UE identifier. In some aspects, the reception module 1404 may receive a UE identifier reallocation message indicating to the UE to replace the first UE identifier with a second UE identifier. In some aspects, the transmission module 1408 may transmit, to the apparatus 1450, a request to update the first UE identifier to the second UE identifier for the preconfigured uplink resources based at least in part on receiving the UE identifier reallocation message. The reception module 1404 or the transmission module 1408 may communicate with the apparatus 1450 based at least in part on the configuration. For example, the transmission module 1408 may transmit, to the apparatus 1450, a preconfigured uplink message in the preconfigured uplink resource, wherein the preconfigured uplink message includes uplink data. In some aspects, the determination module 1406 may determine to transmit the request based at least in part on receiving the UE identifier reallocation message and/or based at least in part on receiving the configuration for the preconfigured uplink resources. The determination module 1406 may instruct the transmission module 1408 to transmit the request.

In some aspects, the transmission module 1408 may transmit, to the apparatus 1450, a connection request that indicates a UE identifier that identifies the UE in a core network. The reception module 1404 may receive, from the apparatus 1450, a configuration for PUR, wherein the configuration indicates an uplink resource and a PUR identifier. The transmission module 1408 may transmit, to the apparatus 1450, a preconfigured uplink message in the uplink resource, wherein the preconfigured uplink message includes uplink data, the UE identifier, and the PUR identifier that is a different type of identifier than the first UE identifier. In some aspects, the determination module 1406 may determine to transmit the request and/or may instruct the transmission module 1408 to transmit the request.

In some aspects, the determination module 1406 may perform a UE identifier reallocation procedure that allocates a second UE identifier, different from the first UE identifier, to the apparatus 1402. The transmission module 1408 may transmit, to the apparatus 1450, a message that includes the PUR identifier based at least in part on performing the UE identifier reallocation procedure.

In some aspects, the reception module 1404 may receive a message that causes the apparatus 1402 to replace the first UE identifier with a second UE identifier. The transmission module 1408 may transmit, to the apparatus 1450, a message that includes the PUR identifier based at least in part on receiving the message that causes the apparatus 1402 to replace the first UE identifier with the second UE identifier.

The apparatus may include additional modules that perform each of the blocks of the algorithm in the aforementioned method 900 of FIG. 9, method 1000 of FIG. 10, and/or the like. Each block in the aforementioned method 900 of FIG. 9, method 1000 of FIG. 10, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 14 are provided as an example. In practice, there may be additional modules, fewer modules, different modules, or differently arranged modules than those shown in FIG. 14. Furthermore, two or more modules shown in FIG. 14 may be implemented within a single module, or a single module shown in FIG. 14 may be implemented as multiple, distributed modules. Additionally, or alternatively, a set of modules (e.g., one or more modules) shown in FIG. 14 may perform one or more functions described as being performed by another set of modules shown in FIG. 14.

Figure 15:
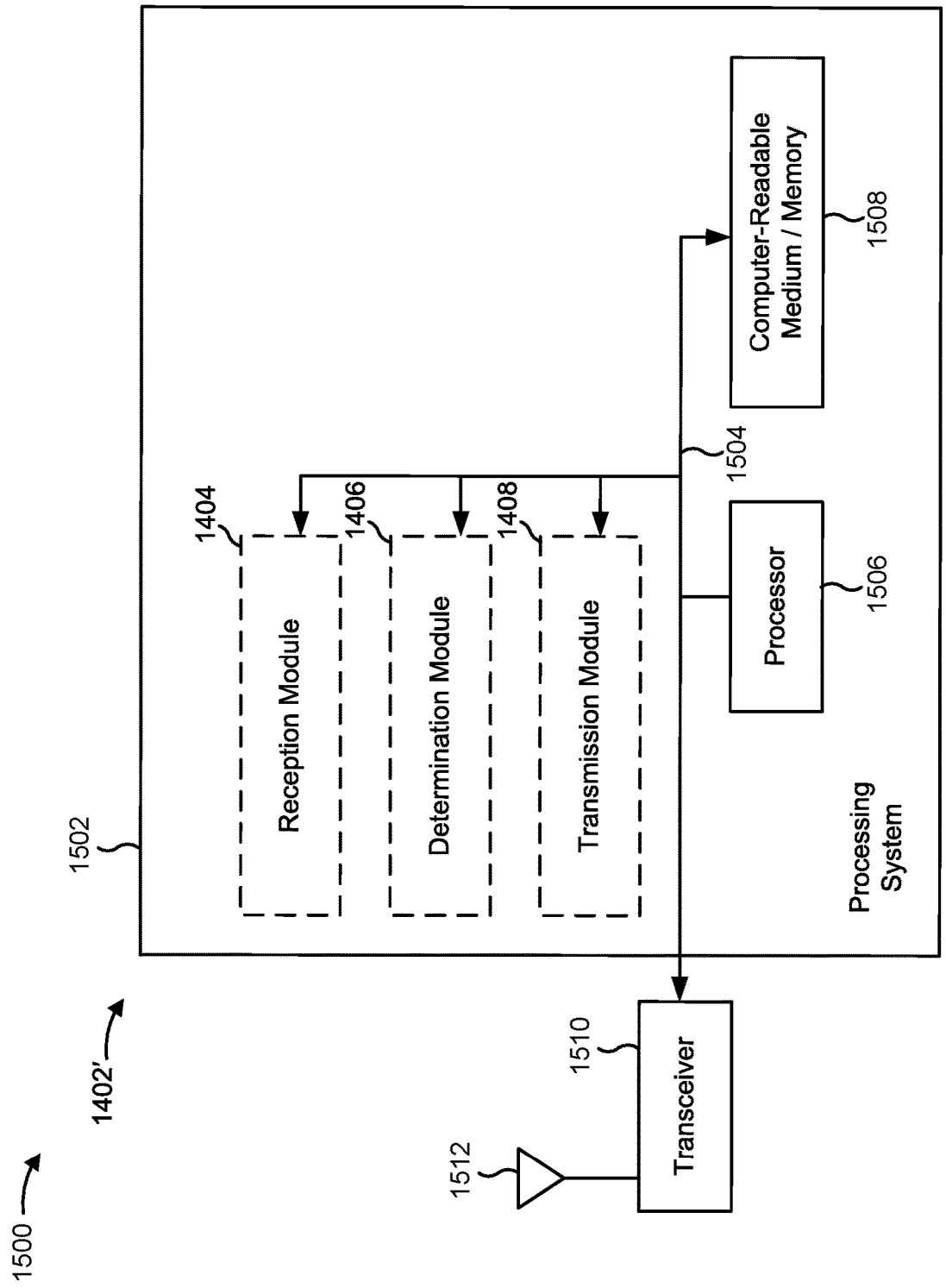
FIG. 15 is a diagram illustrating an example of a hardware implementation for an apparatus employing a processing system.

FIG. 15 is a diagram 1500 illustrating an example of a hardware implementation for an apparatus 1402 employing a processing system 1502. The apparatus 1402 may be a UE.

The processing system 1502 may be implemented with a bus architecture, represented generally by the bus 1504. The bus 1504 may include any number of interconnecting buses and bridges depending on the specific application of the processing system 1502 and the overall design constraints. The bus 1504 links together various circuits including one or more processors and/or hardware modules, represented by the processor 1506, the modules 1404, 1406, 1408, and the computer-readable medium/memory 1508. The bus 1504 may also link various other circuits such as timing sources, peripherals, voltage regulators, and power management circuits, which are well known in the art, and therefore will not be described any further.

The processing system 1502 may be coupled to a transceiver 1510. The transceiver 1510 is coupled to one or more antennas 1512. The transceiver 1510 provides a means for communicating with various other apparatuses over a transmission medium. The transceiver 1510 receives a signal from the one or more antennas 1512, extracts information from the received signal, and provides the extracted information to the processing system 1502, specifically the reception module 1404. In addition, the transceiver 1510 receives information from the processing system 1502, specifically the transmission module 1408, and based at least in part on the received information, generates a signal to be applied to the one or more antennas 1512. The processing system 1502 includes a processor 1506 coupled to a computer-readable medium/memory 1508. The processor 1506 is responsible for general processing, including the execution of software stored on the computer-readable medium/memory 1508. The software, when executed by the processor 1506, causes the processing system 1502 to perform the various functions described herein for any particular apparatus. The computer-readable medium/memory 1508 may also be used for storing data that is manipulated by the processor 1506 when executing software. The processing system further includes at least one of the modules 1404, 1406, 1408, and/or the like. The modules may be software modules running in the processor 1506, resident/stored in the computer readable medium/memory 1508, one or more hardware modules coupled to the processor 1506, or some combination thereof. The processing system 1502 may be a component of the UE 120 and may include the memory 282 and/or at least one of the TX MIMO processor 266, the RX processor 258, and/or the controller/processor 280.

In some aspects, the apparatus 1402 for wireless communication includes means for transmitting, to a base station, a connection request that indicates a first UE identifier for preconfigured uplink resources; means for receiving, from the base station, a configuration for the preconfigured uplink resources; means for receiving a UE identifier reallocation message indicating to the apparatus to replace the first UE identifier with a second UE identifier; means for transmitting, to the base station, a request to update the first UE identifier to the second UE identifier for the preconfigured uplink resources based at least in part on receiving the UE identifier reallocation message; and/or the like. Additionally, or alternatively, the apparatus 1402 for wireless communication includes means for transmitting, to a base station, a connection request that indicates a first UE identifier that identifies the apparatus in a core network; means for receiving, from the base station, a configuration for PUR, wherein the configuration indicates an uplink resource and a PUR identifier that is a different type of identifier than the first UE identifier; means for communicating with the base station based at least in part on the configuration; and/or the like. The aforementioned means may be one or more of the aforementioned modules of the apparatus 1402 and/or the processing system 1502 of the apparatus 1402 configured to perform the functions recited by the aforementioned means. As described elsewhere herein, the processing system 1502 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 15 is provided as an example. Other examples may differ from what is described in connection with FIG. 15.

Figure 16:
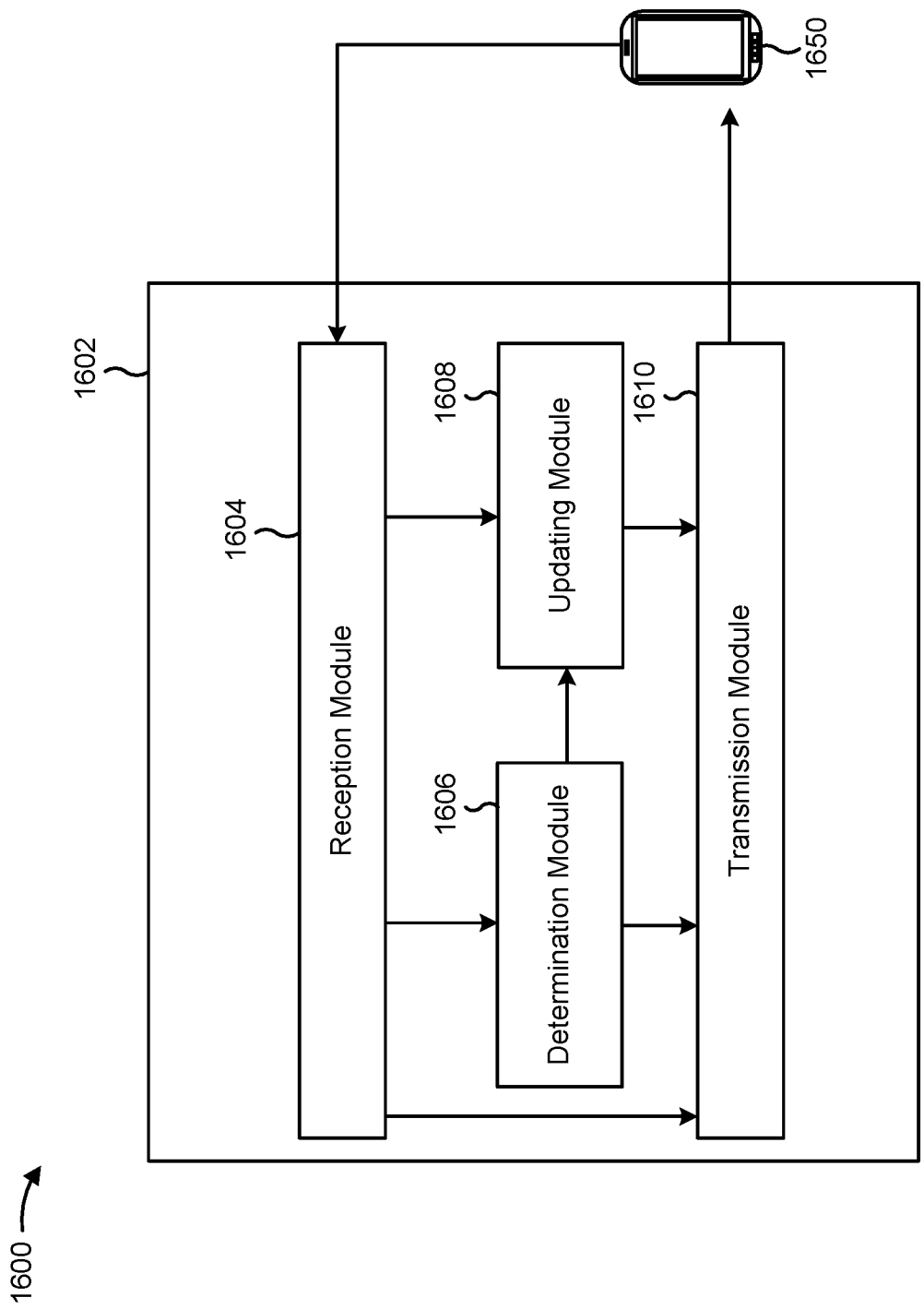
FIG. 16 is a data flow diagram illustrating data flow between different modules/means/components in an example apparatus.

FIG. 16 is a conceptual data flow diagram 1600 illustrating data flow between different modules/means/components in an example apparatus 1602. The apparatus 1602 may be a base station. In some aspects, the apparatus 1602 includes a reception module 1604, a determination module 1606, an updating module 1608, a transmission module 1610, and/or the like.

In some aspects, the reception module 1604 may receive, from an apparatus 1650 (e.g., a UE), a connection request that indicates a first UE identifier for preconfigured uplink resources. The transmission module 1610 may transmit, to the apparatus 1650, a configuration for the preconfigured uplink resources. The reception module 1604 may receive a request to update the first UE identifier to a second UE identifier for the preconfigured uplink resources. The updating module 1608 may update, in a memory of the base station that stores context associated with the preconfigured uplink resources, the first UE identifier to the second UE identifier based at least in part on receiving the request to update the first UE identifier to the second UE identifier. The determination module 1606 may determine to transmit the configuration for the preconfigured uplink resources, and/or may notify the transmission module 1610 to transmit the configuration. Additionally, or alternatively, the determination module 1606 may determine to update the first UE identifier to the second UE identifier and/or may notify the updating module 1608 to perform the update.

In some aspects, the reception module 1604 may receive, from the apparatus 1650, a connection request that indicates a first UE identifier that identifies the UE in a core network. The transmission module 1610 may transmit, to the apparatus 1650, a configuration for PUR, wherein the configuration indicates an uplink resource and a PUR identifier that is a different type of identifier than the first UE identifier. The reception module 1604 or the transmission module 1610 may communicate with the UE based at least in part on the configuration.

The apparatus may include additional modules that perform each of the blocks of the algorithm in the aforementioned method 1100 of FIG. 11, method 1200 of FIG. 12, and/or the like. Each block in the aforementioned method 1100 of FIG. 11, method 1200 of FIG. 12, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 16 are provided as an example. In practice, there may be additional modules, fewer modules, different modules, or differently arranged modules than those shown in FIG. 16. Furthermore, two or more modules shown in FIG. 16 may be implemented within a single module, or a single module shown in FIG. 16 may be implemented as multiple, distributed modules. Additionally, or alternatively, a set of modules (e.g., one or more modules) shown in FIG. 16 may perform one or more functions described as being performed by another set of modules shown in FIG. 16.

Figure 17:
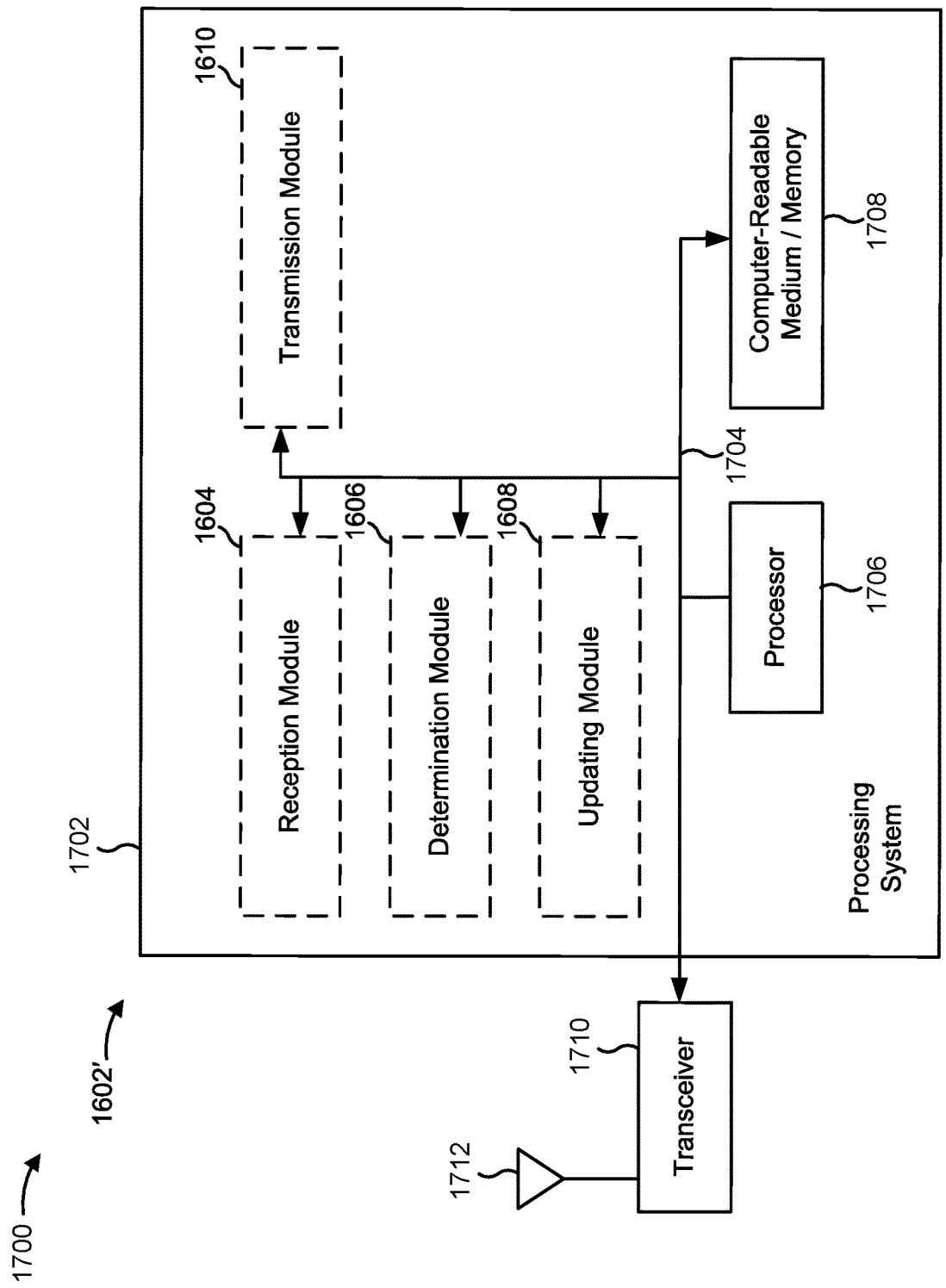
FIG. 17 is a diagram illustrating an example of a hardware implementation for an apparatus employing a processing system.

FIG. 17 is a diagram 1700 illustrating an example of a hardware implementation for an apparatus 1602 employing a processing system 1702. The apparatus 1602' may be a base station.

The processing system 1702 may be implemented with a bus architecture, represented generally by the bus 1704. The bus 1704 may include any number of interconnecting buses and bridges depending on the specific application of the processing system 1702 and the overall design constraints. The bus 1704 links together various circuits including one or more processors and/or hardware modules, represented by the processor 1706, the modules 1604, 1606, 1608, 1610, and/or the like, and the computer-readable medium/memory 1708. The bus 1704 may also link various other circuits such as timing sources, peripherals, voltage regulators, and power management circuits, which are well known in the art, and therefore will not be described any further.

The processing system 1702 may be coupled to a transceiver 1710. The transceiver 1710 is coupled to one or more antennas 1712. The transceiver 1710 provides a means for communicating with various other apparatuses over a transmission medium. The transceiver 1710 receives a signal from the one or more antennas 1712, extracts information from the received signal, and provides the extracted information to the processing system 1702, specifically the reception module 1604. In addition, the transceiver 1710 receives information from the processing system 1702, specifically the transmission module 1610, and based at least in part on the received information, generates a signal to be applied to the one or more antennas 1712. The processing system 1702 includes a processor 1706 coupled to a computer-readable medium/memory 1708. The processor 1706 is responsible for general processing, including the execution of software stored on the computer-readable medium/memory 1708. The software, when executed by the processor 1706, causes the processing system 1702 to perform the various functions described herein for any particular apparatus. The computer-readable medium/memory 1708 may also be used for storing data that is manipulated by the processor 1706 when executing software. The processing system further includes at least one of the modules 1604, 1606, 1608, 1610, and/or the like. The modules may be software modules running in the processor 1706, resident/stored in the computer readable medium/memory 1708, one or more hardware modules coupled to the processor 1706, or some combination thereof. The processing system 1702 may be a component of the eNB 110 and may include the memory 242 and/or at least one of the TX MIMO processor 230, the RX processor 238, and/or the controller/processor 240.

In some aspects, the apparatus 1602 for wireless communication includes means for means for receiving, from a UE, a connection request that indicates a first UE identifier for preconfigured uplink resources; means for transmitting, to the UE, a configuration for the preconfigured uplink resources; means for receiving a request to update the first UE identifier to a second UE identifier for the preconfigured uplink resources; means for updating, in a memory of the apparatus that stores context associated with the preconfigured uplink resources, the first UE identifier to the second UE identifier based at least in part on receiving the request to update the first UE identifier to the second UE identifier; and/or the like. In some aspects, the apparatus 1602 may include means for receiving, from a UE, a connection request that indicates a first UE identifier that identifies the UE in a core network; means for transmitting, to the UE, a configuration for PUR, wherein the configuration indicates an uplink resource and a PUR identifier that is a different type of identifier than the first UE identifier; means for communicating with the UE based at least in part on the configuration; means for receiving, from the UE, a preconfigured uplink message in the uplink resource, wherein the preconfigured uplink message includes uplink data, the UE identifier, and the PUR identifier; and/or the like. The aforementioned means may be one or more of the aforementioned modules of the apparatus 1602 and/or the processing system 1702 of the apparatus 1602' configured to perform the functions recited by the aforementioned means. As described elsewhere herein, the processing system 1702 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 17 is provided as an example. Other examples may differ from what is described in connection with FIG. 17.

Figure 18:
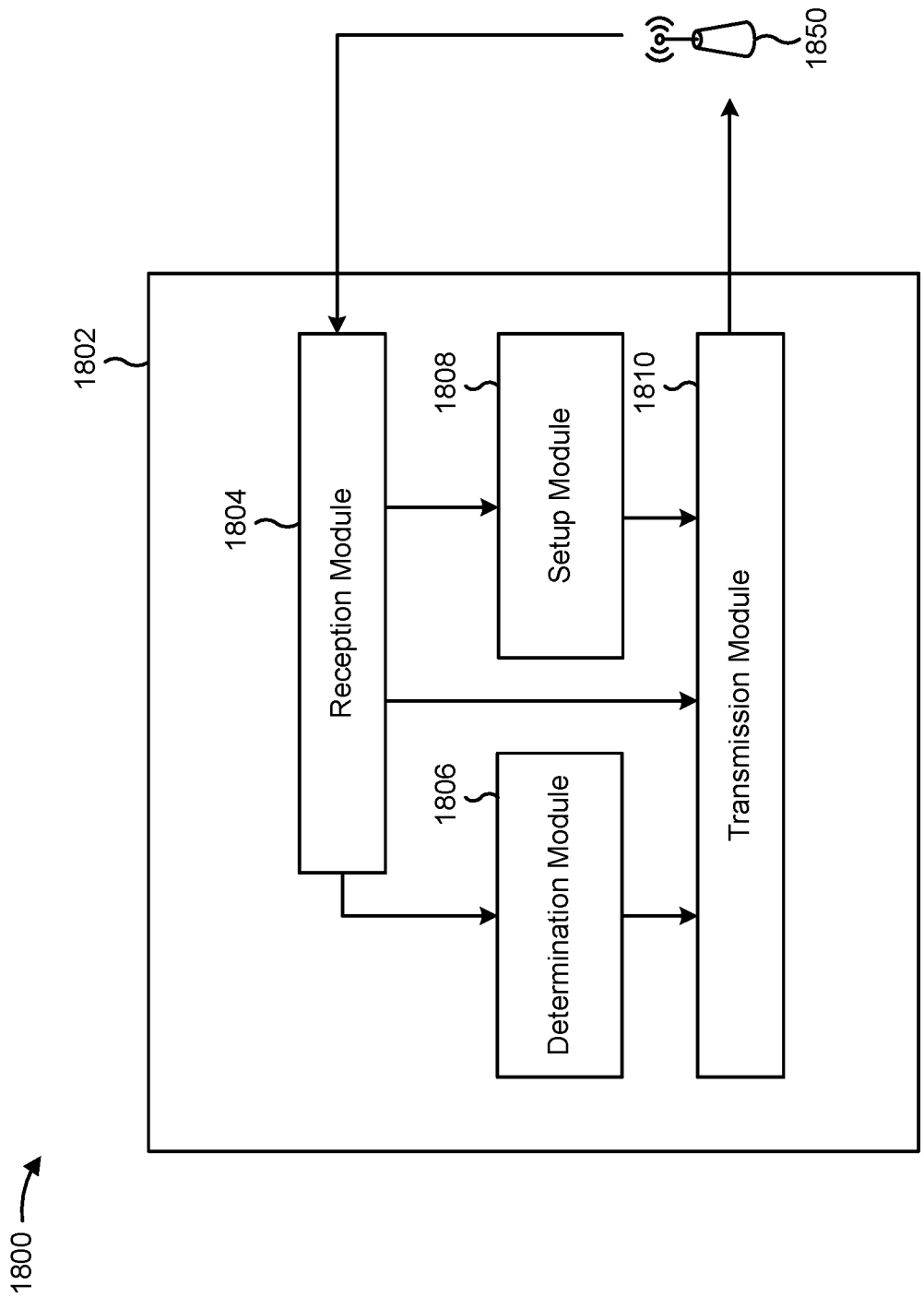
FIG. 18 is a data flow diagram illustrating data flow between different modules/means/components in an example apparatus.

FIG. 18 is a conceptual data flow diagram 1800 illustrating data flow between different modules/means/components in an example apparatus 1802. The apparatus 1802 may be a core network device. In some aspects, the apparatus 1802 includes a reception module 1804, a determination module 1806, an updating module 1808, a transmission module 1810, and/or the like.

In some aspects, the setup module 1808 may set up a connection with an apparatus 1850 (e.g., a base station), wherein the connection is associated with a UE and a first UE identifier that identifies the UE in a core network and that is associated with preconfigured uplink resources for the UE. The transmission module 1810 may transmit, to the UE via the apparatus 1850, a UE identifier reallocation message indicating to the UE to replace the first UE identifier with a second UE identifier. The transmission module 1810 may transmit, to the apparatus 1850, a request to update the first UE identifier to the second UE identifier for the preconfigured uplink resources. The determination module 1806 may determine to set up the connection, may determine to transmit the UE identifier reallocation message, and/or may determine to transmit the request. The determination module 1806 may notify the transmission module 1810 accordingly.

The apparatus may include additional modules that perform each of the blocks of the algorithm in the aforementioned method 1300 of FIG. 13 and/or the like. Each block in the aforementioned method 1300 of FIG. 13 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 18 are provided as an example. In practice, there may be additional modules, fewer modules, different modules, or differently arranged modules than those shown in FIG. 18. Furthermore, two or more modules shown in FIG. 18 may be implemented within a single module, or a single module shown in FIG. 18 may be implemented as multiple, distributed modules. Additionally, or alternatively, a set of modules (e.g., one or more modules) shown in FIG. 18 may perform one or more functions described as being performed by another set of modules shown in FIG. 18.

Figure 19:
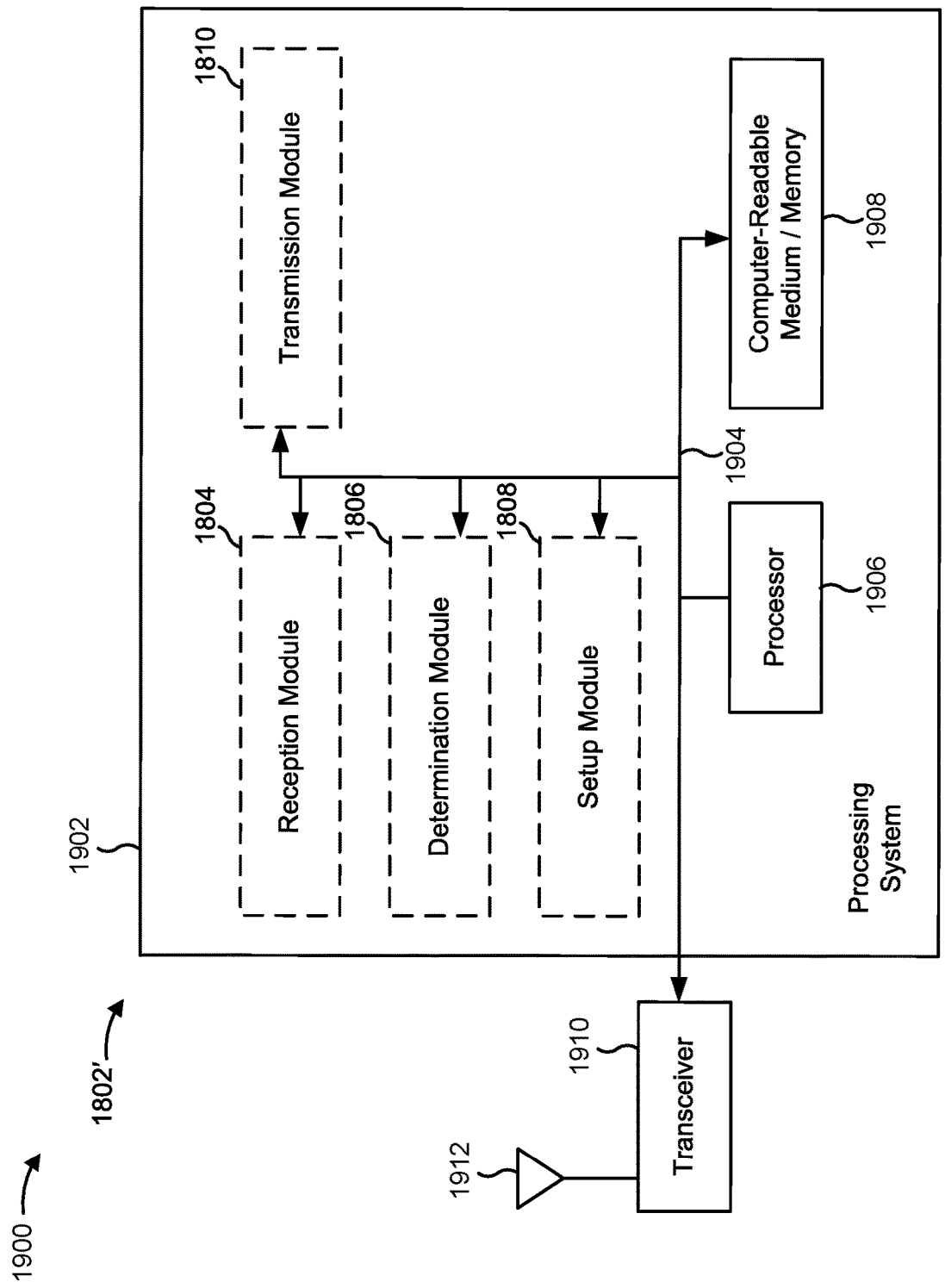
FIG. 19 is a diagram illustrating an example of a hardware implementation for an apparatus employing a processing system.

FIG. 19 is a diagram 1900 illustrating an example of a hardware implementation for an apparatus 1802 employing a processing system 1902. The apparatus 1802' may be a core network device.

The processing system 1902 may be implemented with a bus architecture, represented generally by the bus 1904. The bus 1904 may include any number of interconnecting buses and bridges depending on the specific application of the processing system 1902 and the overall design constraints. The bus 1904 links together various circuits including one or more processors and/or hardware modules, represented by the processor 1906, the modules 1804, 1806, 1808, 1810, and/or the like, and the computer-readable medium/memory 1908. The bus 1904 may also link various other circuits such as timing sources, peripherals, voltage regulators, and power management circuits, which are well known in the art, and therefore will not be described any further.

The processing system 1902 may be coupled to a transceiver 1910. The transceiver 1910 is coupled to one or more antennas 1912. The transceiver 1910 provides a means for communicating with various other apparatuses over a transmission medium. The transceiver 1910 receives a signal from the one or more antennas 1912, extracts information from the received signal, and provides the extracted information to the processing system 1902, specifically the reception module 1804. In addition, the transceiver 1910 receives information from the processing system 1902, specifically the transmission module 1810, and based at least in part on the received information, generates a signal to be applied to the one or more antennas 1912. The processing system 1902 includes a processor 1906 coupled to a computer-readable medium/memory 1908. The processor 1906 is responsible for general processing, including the execution of software stored on the computer-readable medium/memory 1908. The software, when executed by the processor 1906, causes the processing system 1902 to perform the various functions described herein for any particular apparatus. The computer-readable medium/memory 1908 may also be used for storing data that is manipulated by the processor 1906 when executing software. The processing system further includes at least one of the modules 1804, 1806, 1808, 1810, and/or the like. The modules may be software modules running in the processor 1906, resident/stored in the computer readable medium/memory 1908, one or more hardware modules coupled to the processor 1906, or some combination thereof. The processing system 1902 may be a component of the network controller 130 and may include the memory 292, the controller/processor 290, and/or the communication unit 294.

In some aspects, the apparatus 1802 includes means for setting up a connection with a base station, wherein the connection is associated with a UE and a first UE identifier that identifies the UE in a core network and that is associated with preconfigured uplink resources for the UE; means for transmitting, to the UE via the base station, a UE identifier reallocation message indicating to the UE to replace the first UE identifier with a second UE identifier; means for transmitting, to the base station, a request to update the first UE identifier to the second UE identifier for the preconfigured uplink resources; and/or the like. The aforementioned means may be one or more of the aforementioned modules of the apparatus 1802 and/or the processing system 1902 of the apparatus 1802 configured to perform the functions recited by the aforementioned means. As described elsewhere herein, the processing system 1902 may include the memory 292, the controller/processor 290, and/or the communication unit 294. In one configuration, the aforementioned means may be the memory 292, the controller/processor 290, and/or the communication unit 294 configured to perform the functions and/or operations recited herein.

FIG. 19 is provided as an example. Other examples may differ from what is described in connection with FIG. 19.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
    transmitting, to a network entity, a radio resource control (RRC) connection request that includes a first UE identifier that identifies the UE in a core network;
    receiving, from the network entity, a configuration for preconfigured uplink resources (PUR), wherein the configuration indicates an uplink resource and includes a PUR identifier;
    performing a UE identifier reallocation procedure that allocates a second UE identifier to the UE, wherein the second UE identifier is different from the first UE identifier, and the UE identifier reallocation procedure does not change the PUR identifier; and
    transmitting, to the network entity, a message that includes at least one of the PUR identifier or the second UE identifier after performing the UE identifier reallocation procedure.

2. The method of claim 1, wherein communicating with the network entity comprises transmitting, to the network entity, a preconfigured uplink message in the uplink resource, wherein the preconfigured uplink message includes uplink data.

3. The method of claim 1, further comprising transmitting, to the network entity, a message that includes the PUR identifier.

4. The method of claim 1, wherein the UE identifier reallocation procedure comprises receiving a message that causes the UE to replace the first UE identifier with a second UE identifier.

5. The method of claim 1, wherein the first UE identifier is a non-access stratum (NAS) identifier, a serving temporary mobile subscriber identity (S-TMSI), or a fifth generation (5G) TMSI.

6. The method of claim 1, wherein the first UE identifier is a first non-access stratum (NAS) identifier, a first serving temporary mobile subscriber identity (S-TMSI), or a first fifth generation (5G)S-TMSI, and the PUR identifier is a second NAS identifier, a second S-TMSI, or a second 5G S-TMSI.

7. A method of wireless communication performed by a network entity, comprising:
    receiving, from a user equipment (UE), a radio resource control (RRC) connection request that includes a first UE identifier that identifies the UE in a core network;
    transmitting, to the UE, a configuration for preconfigured uplink resources (PUR), wherein the configuration indicates an uplink resource and includes a PUR identifier;
    performing a UE identifier reallocation procedure that allocates a second UE identifier to the UE, wherein the second UE identifier is different from the first UE identifier, and the UE identifier reallocation procedure does not change the PUR identifier; and
    receiving, from the UE, a message that includes at least one of the PUR identifier or the second UE identifier, after performing the UE identifier reallocation procedure.

8. The method of claim 7, wherein communicating with the UE comprises receiving, from the UE, a preconfigured uplink message in the uplink resource, wherein the preconfigured uplink message includes uplink data.

9. The method of claim 7, wherein the UE identifier reallocation procedure comprises transmitting a message that causes the UE to replace the first UE identifier with a second UE identifier.

10. The method of claim 7, wherein the first UE identifier is a first non-access stratum (NAS) identifier, a first serving temporary mobile subscriber identity (S-TMSI), or a first fifth generation (5G)S-TMSI, and the second UE identifier is a second NAS identifier, a second S-TMSI, or a second 5G S-TMSI.

11. The method of claim 7, further comprising identifying a context associated with the preconfigured uplink resources based at least in part on the PUR identifier.

12. A user equipment (UE) for wireless communication, comprising:
    a memory; and
    one or more processors coupled to the memory, the one or more processors configured to:
        transmit, to a network entity, a radio resource control (RRC) connection request that includes a first UE identifier that identifies the UE in a core network;
        receive, from the network entity, a configuration for preconfigured uplink resources (PUR), wherein the configuration indicates an uplink resource and includes a PUR identifier;
        perform a UE identifier reallocation procedure that allocates a second UE identifier to the UE, wherein the second UE identifier is different from the first UE identifier, and the UE identifier reallocation procedure does not change the PUR identifier; and transmit, to the network entity, a message that includes at least one of the PUR identifier or the second UE identifier, after performing the UE identifier reallocation procedure.

13. The UE of claim 12, wherein the one or more processors, when communicating with the network entity, are configured to transmit, to the network entity, a preconfigured uplink message in the uplink resource, wherein the preconfigured uplink message includes uplink data.

14. The UE of claim 12, wherein the one or more processors are further configured to transmit, to the network entity, a message that includes the PUR identifier.

15. The UE of claim 12, wherein the first UE identifier is a first non-access stratum (NAS) identifier, a first serving temporary mobile subscriber identity (S-TMSI), or a first fifth generation (5G)S-TMSI, and the second UE identifier is a second NAS identifier, a second S-TMSI, or a second 5G S-TMSI.

16. The UE of claim 12, wherein UE identifier reallocation procedure comprises receiving a message that causes the UE to replace the first UE identifier with a second UE identifier.

17. The UE of claim 12, wherein the first UE identifier is a non-access stratum (NAS) identifier, a serving temporary mobile subscriber identity (S-TMSI), or a fifth generation (5G) TMSI.

18. A network entity for wireless communication, comprising:

a memory; and one or more processors coupled to the memory, the one or more processors configured to:

receive, from a user equipment (UE), a radio resource control (RRC) connection request that includes a first UE identifier that identifies the UE in a core network;

transmit, to the UE, a configuration for preconfigured uplink resources (PUR), wherein the configuration indicates an uplink resource and includes a PUR identifier;

perform a UE identifier reallocation procedure that allocates a second UE identifier to the UE, wherein the second UE identifier is different from the first UE identifier, and the UE identifier reallocation procedure does not change the PUR identifier; and receive, from the UE, a message that includes at least one of the PUR identifier or the second UE identifier, after performing the UE identifier reallocation procedure.

19. The network entity of claim 18, where the UE identifier reallocation procedure comprises transmitting a message that causes the UE to replace the first UE identifier with a second UE identifier.

20. The method of claim 1, wherein the message, transmitted after performing the UE identifier reallocation procedure, includes the PUR identifier and the second UE identifier.

21. The method of claim 7, wherein the message, transmitted after performing the UE identifier reallocation procedure, includes the PUR identifier and the second UE identifier.

22. The UE of claim 12, wherein the message, transmitted after performing the UE identifier reallocation procedure, includes the PUR identifier and the second UE identifier.

23. The network entity of claim 18, wherein the message, transmitted after performing the UE identifier reallocation procedure, includes the PUR identifier and the second UE identifier.

24. A user equipment (UE) for wireless communication, comprising:

means for transmitting, to a network entity, a radio resource control (RRC) connection request that includes a first UE identifier that identifies the UE in a core network;

means for receiving, from the network entity, a configuration for preconfigured uplink resources (PUR), wherein the configuration indicates an uplink resource and includes a PUR identifier;

means for performing a UE identifier reallocation procedure that allocates a second UE identifier to the UE, wherein the second UE identifier is different from the first UE identifier, wherein the UE identifier reallocation procedure does not change the PUR identifier;

means for transmitting, to the network entity, a message that includes at least one of the PUR identifier or the second UE identifier, after performing the UE identifier reallocation procedure; and means for communicating with the network entity based at least in part on the configuration.

25. A network entity for wireless communication, comprising:

means for receiving, from a user equipment (UE), a radio resource control (RRC) connection request that includes a first UE identifier that identifies the UE in a core network;

means for transmitting, to the UE, a configuration for preconfigured uplink resources (PUR), wherein the configuration indicates an uplink resource and includes a PUR identifier;

means for performing a UE identifier reallocation procedure that allocates a second UE identifier to the UE, wherein the second UE identifier is different from the first UE identifier, wherein the UE identifier reallocation procedure does not change the PUR identifier; and means for receiving, from the UE, a message that includes at least one of the PUR identifier or the second UE identifier, after performing the UE identifier reallocation procedure; and means for communicating with the UE based at least in part on the configuration.

* * * * *